United States Patent
Shimezawa et al.

(10) Patent No.: US 11,122,618 B2
(45) Date of Patent: Sep. 14, 2021

(54) COMMUNICATION APPARATUS, BASE STATION APPARATUS, METHOD, AND RECORDING MEDIUM

(71) Applicant: Sony Corporation, Tokyo (JP)

(72) Inventors: Kazuyuki Shimezawa, Kanagawa (JP); Naoki Kusashima, Kanagawa (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 39 days.

(21) Appl. No.: 16/607,735

(22) PCT Filed: Mar. 9, 2018

(86) PCT No.: PCT/JP2018/009341
§ 371 (c)(1),
(2) Date: Oct. 24, 2019

(87) PCT Pub. No.: WO2018/203441
PCT Pub. Date: Nov. 8, 2018

(65) Prior Publication Data
US 2020/0059960 A1   Feb. 20, 2020

(30) Foreign Application Priority Data
May 1, 2017 (JP) .............................. JP2017-091203

(51) Int. Cl.
*H04W 74/02* (2009.01)
*H04W 72/14* (2009.01)
(Continued)

(52) U.S. Cl.
CPC ........... *H04W 74/02* (2013.01); *H04L 1/1809* (2013.01); *H04W 72/042* (2013.01);
(Continued)

(58) Field of Classification Search
CPC . H04W 74/02; H04W 74/006; H04W 72/042; H04W 72/04466; H04W 72/1268;
(Continued)

(56) References Cited

U.S. PATENT DOCUMENTS 10,880,914 B2 * 12/2020 Sundararajan .... H04W 72/1268
2017/0367110 A1 * 12/2017 Li ..................... H04W 74/0816
(Continued)

OTHER PUBLICATIONS

Huawei, et al., "Grant-Free Transmission for UL URLLC", 3GPP TSG RAN WG1 Meeting #88b, R1-1704222, Apr. 3-7, 2017.
(Continued)

*Primary Examiner* — Candal Elpenord
(74) *Attorney, Agent, or Firm* — Xsensus LLP

(57) ABSTRACT

[Object]
To provide a mechanism that can improve the transmission efficiency of the entire system in an environment in which dynamic resource sharing is performed.
[Solving Means]
Provided is a communication apparatus that communicates with a base station apparatus that receives first uplink data of grant-free transmission and second uplink data of grant-based transmission, the communication apparatus including: a setting unit that performs setting regarding grant-free transmission available resources based on setting information received from the base station apparatus; and a communication processing unit that receives, in a predetermined first slot, a downlink control channel including parameter information for grant-free transmission and that uses uplink resources selected from the grant-free transmission available resources to transmit the first uplink data generated based on the parameter information.

20 Claims, 15 Drawing Sheets

(51) Int. Cl.
*H04W 72/04* (2009.01)
*H04W 74/00* (2009.01)
*H04W 72/12* (2009.01)
*H04L 1/18* (2006.01)
*H04W 8/22* (2009.01)

(52) U.S. Cl.
CPC ... *H04W 72/0446* (2013.01); *H04W 72/1205* (2013.01); *H04W 72/1268* (2013.01); *H04W 72/1289* (2013.01); *H04W 72/14* (2013.01); *H04W 74/006* (2013.01); *H04W 8/22* (2013.01)

(58) Field of Classification Search
CPC ............ H04W 72/1289; H04W 72/14; H04W 72/1205; H04W 8/22; H04L 1/1809
See application file for complete search history.

(56) References Cited

U.S. PATENT DOCUMENTS

| | | | | |
|---|---|---|---|---|
| 2018/0123765 | A1* | 5/2018 | Cao | H04L 1/1896 |
| 2019/0174472 | A1* | 6/2019 | Lee | H04W 72/042 |
| 2019/0327757 | A1* | 10/2019 | Oteri | H04L 5/0053 |
| 2020/0028640 | A1* | 1/2020 | Yeo | H04L 5/0051 |

OTHER PUBLICATIONS

International Search Report and Written Opinion dated May 29, 2018 for PCT/JP2018/009341 filed on Mar. 9, 2018, 9 pages including English Translation of the International Search Report.

Intel Corporation, "eMBB/URLLC multiplexing for UL", 3GPP TSG RAN1 WG Meeting No. 88bis R1-1704764, Spokane, USA, Apr. 3-7, 2017, pp. 1-6.

LG Electronics, "Considerations on PDCCH design for URLLC", 3GPP TSG RAN WG1 Meeting No. 88bis R1-1704905, Spokane, USA, Apr. 3-7, 2017, 4 pages.

CATT, "Multiplexing of URLLC and eMBB traffic in UL", 3GPP TSG RAN WG1 Meeting No. 88bis R1-1704587, Spokane, USA, Apr. 3-7, 2017, pp. 1-5.

Samsung, "Power control for UL eMBB/URLLC multiplexing", 3GPP TSG RAN WG1 Meeting No. 88bis R1-1705409, Spokane, USA, Apr. 3-7, 2017, pp. 1-5.

Sony, "Dynamic Resource Sharing for eMBB/URLLC in DL", 3GPP TSG RAN WG1 Meeting No. 87 R1-1611545, Lisbon, Portugal Oct. 10-14, 2016, 5 pages.

3GPP, "3rd Generation Partnership Project; Technical Specification Group Radio Access Network; Study on Scenarios and Requirements for Next Generation Access Technologies", Release 14, 3GPP TR 38.913 V0.3.0, Mar. 2016, pp. 1-30.

Extended European Search Report dated Mar. 26, 2020 in European Patent Application No. 18794049.9, 14 pages.

Intel Corporation, "Uplink URLLC Transmission without Grant," 3GPP TSG RAN WG1 NR Ad-Hoc Meeting, R1-1701206, Jan. 16-20, 2017, 10 pages.

Fujitsu, "DL control channel related to multiplexing eMBB and URLLC," 3GPP TSG RAN WG1 Meeting #86bis, R1-1608814, Oct. 10-14, 2016, 4 pages.

Sony, "On eMBB/URLLC multiplexing for Uplink," 3GPP TSG RAN WG1 Meeting #89, R1-1708257, May 15-19, 2017, 3 pages.

* cited by examiner

FIG. 8
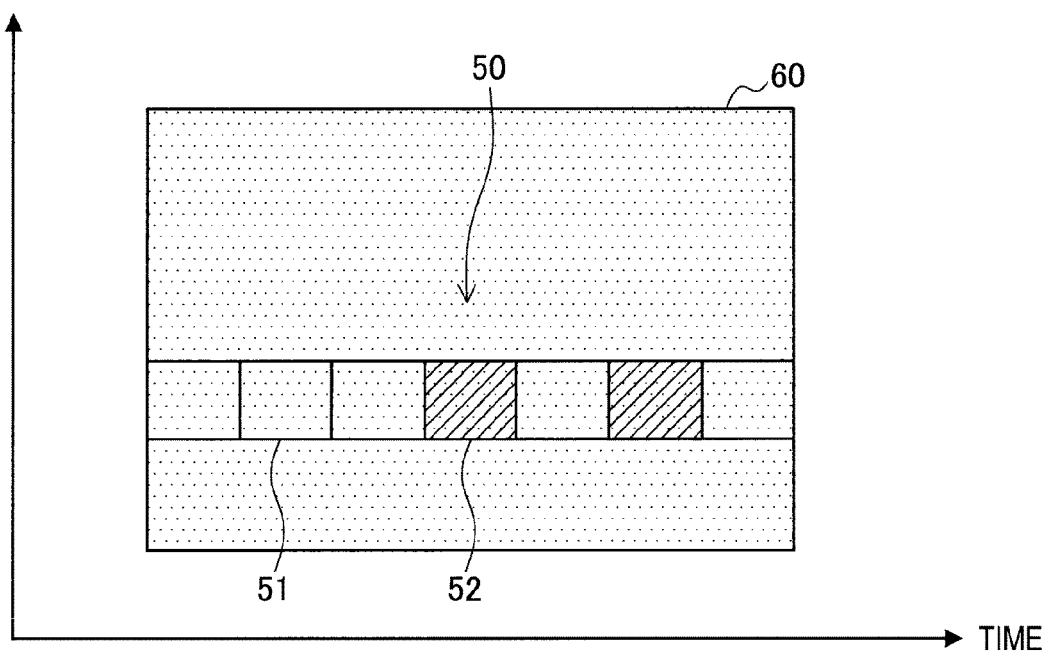
 eMBB
 URLLC : NO TRANSMISSION
 URLLC : TRANSMISSION

COMMUNICATION APPARATUS, BASE STATION APPARATUS, METHOD, AND RECORDING MEDIUM

CROSS-REFERENCE TO RELATED APPLICATIONS

The present application is based on PCT filing PCT/JP2018/009341, filed Mar. 9, 2018, which claims priority to JP 2017-091203, filed May 1, 2017, the entire contents of each are incorporated herein by reference.

TECHNICAL FIELD

The present disclosure relates to a communication apparatus, a base station apparatus, a method, and a recording medium.

BACKGROUND ART

Wireless access systems and wireless networks of cellular mobile communication (hereinafter, also referred to as "Long Term Evolution (LTE)," "LTE-Advanced (LTE-A)," "LTE-Advanced Pro (LTE-A Pro)," "5G (5th generation)," "New Radio (NR)," "New Radio Access Technology (NRAT)," "Evolved Universal Terrestrial Radio Access (EUTRA)," or "Further EUTRA (FEUTRA)") are examined in a 3rd generation partnership project (3rd Generation Partnership Project: 3GPP). Note that in the following description, the LTE includes the LTE-A, the LTE-A Pro, and the EUTRA, and the NR includes the NRAT and the FEUTRA. In the LTE and the NR, a base station apparatus (base station) is also called an eNodeB (evolved NodeB) in the LTE and a gNodeB in the NR. A terminal apparatus (mobile station, mobile station apparatus, terminal) is also called UE (User Equipment). Each of the LTE and the NR is a cellular communication system including a cellular arrangement of a plurality of areas covered by the base station apparatus. A single base station apparatus may manage a plurality of cells.

The NR is a next-generation wireless access system of the LTE and is a RAT (Radio Access Technology) different from the LTE. The NR is an access technology that can correspond to various use cases including eMBB (Enhanced mobile broadband), mMTC (Massive machine type communications), and URLLC (Ultra reliable and low latency communications). The NR is examined toward a technical framework corresponding to use scenarios, requirements, arrangement scenarios, and the like of the use cases. Details of the scenarios and the requirements of the NR are disclosed in NPL 1.

In the URLLC, realization of low-delay (low-latency) transmission is desired. Particularly, in the uplink transmission of the URLLC, it is examined to realize a reduction of delay by simplifying the control necessary for the data transmission of the terminal. In a case where uplink data is generated in the terminal in a conventional uplink transmission method, the terminal first issues a resource allocation request for uplink transmission to the base station, and then the base station notifies the terminal of control information for allocating resources for uplink transmission (uplink grant, uplink allocation). The terminal uses the allocated resources to perform the uplink transmission. Such a control step is executed every time the uplink transmission is performed, and this causes a delay.

Therefore, resources for the uplink transmission are allocated in advance, and the terminal uses the transmission available resources allocated in advance to perform the uplink transmission in a case where data is generated in the terminal. This can shorten the time from the generation of data to the transmission of data, and the low-delay transmission can be realized. Such transmission is called grant-free transmission. Details of the grant-free transmission is disclosed in NPL 2.

In addition, the eMBB is broadband transmission, and the data is transmitted on the basis of a predetermined slot length. In addition, the URLLC includes low-delay (low-latency) transmission, and the data is transmitted in a time unit (mini slot) shorter than the slot length of the eMBB. That is, the TTI (Transmission Time Interval) in the URLLC is shorter than the TTI in the eMBB. Therefore, the data transmission of the URLLC may occur after the data transmission of the eMBB is already started. An example of a method of multiplexing the data of the eMBB and the data of the URLLC includes frequency division multiplexing. However, the frequency resources for the data transmission of the URLLC need to be maintained, and the use efficiency of resources is reduced in a case where the frequency of the data transmission of the URLLC is low.

Therefore, dynamic resource sharing of the eMBB and the URLLC is examined in the NR. In a case where the data transmission of the URLLC occurs in the dynamic resource sharing of the eMBB and the URLLC, the data of the URLLC may be transmitted while the data overlaps with the resources in the slot in which the data of the eMBB is transmitted. Although the overlap is an interference for each other, the reduction in the use efficiency of resources can be improved. Details of the dynamic resource sharing of the eMBB and the URLLC are disclosed in NPL 3.

CITATION LIST

Non Patent Literature

[NPL 1]
3rd Generation Partnership Project; Technical Specification Group Radio Access Network; Study on Scenarios and Requirements for Next Generation Access Technologies; (Release 14), 3GPP TR 38.913 V0.3.0 (2016-03). Internet <URL:http://www.3gpp.org/ftp/Specs/archive/38_series/38.913/38913-030.zip>

[NPL 2]
R1-1704222, "Grant-free transmission for UL URLLC," Huawei, HiSilicon, 3GPP TSG RAN WG1 Meeting #88b, April 2017. Internet <URL:http://www.3gpp.org/ftp/Meetings_3GPP_SYNC/RAN1/Docs/R1-1704222.zip>

[NPL 3]
R1-1611545, "Dynamic Resource Sharing for eMBB/URLLC in DL," Sony, 3GPP TSG RAN WG1 Meeting #87, October 2016. Internet <URL:http://www.3gpp.org/ftp/tsg_ran/WG1_RL1/TSGR1_87/Docs/R1-1611545.zip>

SUMMARY

Technical Problem

In an environment in which, for example, the resources of the eMBB data and the URLLC data may overlap in the uplink transmission, the interference on the URLLC data dynamically changes depending on whether or not there is eMBB data. Therefore, it is desirable that parameter information for the uplink transmission of the URLLC data be able to be dynamically controlled according to the dynamically changing interference. Otherwise, parameter information that is not optimal would be used, and this reduces the transmission efficiency.

Thus, the present disclosure provides a mechanism that can improve the transmission efficiency of the entire system in an environment in which dynamic resource sharing is performed.

Solution to Problem

According to the present disclosure, provided is a communication apparatus that communicates with a base station apparatus that receives first uplink data of grant-free transmission and second uplink data of grant-based transmission, the communication apparatus including: a setting unit that performs setting regarding grant-free transmission available resources based on setting information received from the base station apparatus; and a communication processing unit that receives, in a predetermined first slot, a downlink control channel including parameter information for grant-free transmission and that uses uplink resources selected from the grant-free transmission available resources to transmit the first uplink data generated based on the parameter information.

In addition, according to the present disclosure, provided is a base station apparatus that communicates with a first communication apparatus for grant-free transmission of first uplink data and a second communication apparatus for grant-based transmission of second uplink data, the base station apparatus including: a setting unit that transmits setting information regarding grant-free transmission available resources to the first communication apparatus; and a communication processing unit that transmits, in a predetermined first slot, a downlink control channel including parameter information for grant-free transmission and that receives the first uplink data generated based on the parameter information, the first uplink data transmitted from the first communication apparatus using uplink resources selected from the grant-free transmission available resources.

In addition, according to the present disclosure, provided is a method executed by a communication apparatus that communicates with a base station apparatus that receives first uplink data of grant-free transmission and second uplink data of grant-based transmission, the method including: performing setting regarding grant-free transmission available resources based on setting information received from the base station apparatus; and receiving, in a predetermined first slot, a downlink control channel including parameter information for grant-free transmission and using uplink resources selected from the grant-free transmission available resources to transmit the first uplink data generated based on the parameter information.

In addition, according to the present disclosure, provided is a method executed by a base station apparatus that communicates with a first communication apparatus for grant-free transmission of first uplink data and a second communication apparatus for grant-based transmission of second uplink data, the method including: transmitting setting information regarding grant-free transmission available resources to the first communication apparatus; and transmitting, in a predetermined first slot, a downlink control channel including parameter information for grant-free transmission and receiving the first uplink data generated based on the parameter information, the first uplink data transmitted from the first communication apparatus using uplink resources selected from the grant-free transmission available resources.

In addition, according to the present disclosure, provided is a recording medium recording a program for causing a computer to function as a communication apparatus that communicates with a base station apparatus that receives first uplink data of grant-free transmission and second uplink data of grant-based transmission, the communication apparatus including: a setting unit that performs setting regarding grant-free transmission available resources based on setting information received from the base station apparatus; and a communication processing unit that receives, in a predetermined first slot, a downlink control channel including parameter information for grant-free transmission and that uses uplink resources selected from the grant-free transmission available resources to transmit the first uplink data generated based on the parameter information.

In addition, according to the present disclosure, provided is a recording medium recording a program for causing a computer to function as a base station apparatus that communicates with a first communication apparatus for grant-free transmission of first uplink data and a second communication apparatus for grant-based transmission of second uplink data, the base station apparatus including: a setting unit that transmits setting information regarding grant-free transmission available resources to the first communication apparatus; and a communication processing unit that transmits, in a predetermined first slot, a downlink control channel including parameter information for grant-free transmission and that receives the first uplink data generated based on the parameter information, the first uplink data transmitted from the first communication apparatus using uplink resources selected from the grant-free transmission available resources.

According to the present disclosure, the communication apparatus that performs grant-free transmission is notified of, through the control channel, the parameter information for the grant-free transmission. As a result, the base station apparatus can dynamically control the parameter information for the grant-free transmission. Therefore, the communication apparatus can appropriately update the parameter information for the grant-free transmission to optimal parameter information according to whether or not there is an interference dynamically generated between the first uplink data of grant-free transmission and the second uplink data of grant-based transmission. As a result, the transmission efficiency of the entire system can be improved.

Advantageous Effect of Invention

As described above, according to the present disclosure, provided is a mechanism that can improve the transmission efficiency of the entire system in an environment in which dynamic resource sharing is performed. Note that the advantageous effect may not be limited, and any of the advantageous effects illustrated in the present specification or other advantageous effects that can be understood from the present specification may also be attained in addition to or in place of the advantageous effect.

BRIEF DESCRIPTION OF DRAWINGS

FIG. 8 is a diagram for describing an example of dynamic resource sharing according to the present embodiment.

DESCRIPTION OF EMBODIMENT

Hereinafter, a preferred embodiment of the present disclosure will be described in detail with reference to the attached drawings. Note that in the present specification and the drawings, the same reference signs are provided to the constituent elements with substantially the same functional configurations, and the description will not be repeated.

Note that the embodiment will be described in the following order.

1. Introduction
1.1. Overall Configuration
1.2. Related Technique
2. Configuration Example of Each Apparatus
2.1. Configuration Example of Base Station Apparatus
2.2. Configuration Example of URLLC Terminal
3. Technical Features
3.1. Dynamic Resource Sharing
3.2. Parameter Information
   3.2.1. Grant-Free Transmission Parameter Information
   3.2.2. Grant-Based Transmission Parameter Information
3.3. Notification Method of Grant-Free Transmission Parameter Information
3.4. Application Period of Grant-Free Transmission Parameter Information
3.5. Modification
4. Application Examples
   4.1. Application Example Regarding Base Station Apparatus
   4.2. Application Example Regarding Terminal Apparatus
5. Conclusion 1. Introduction <1.1. Overall Configuration>

Figure 1:
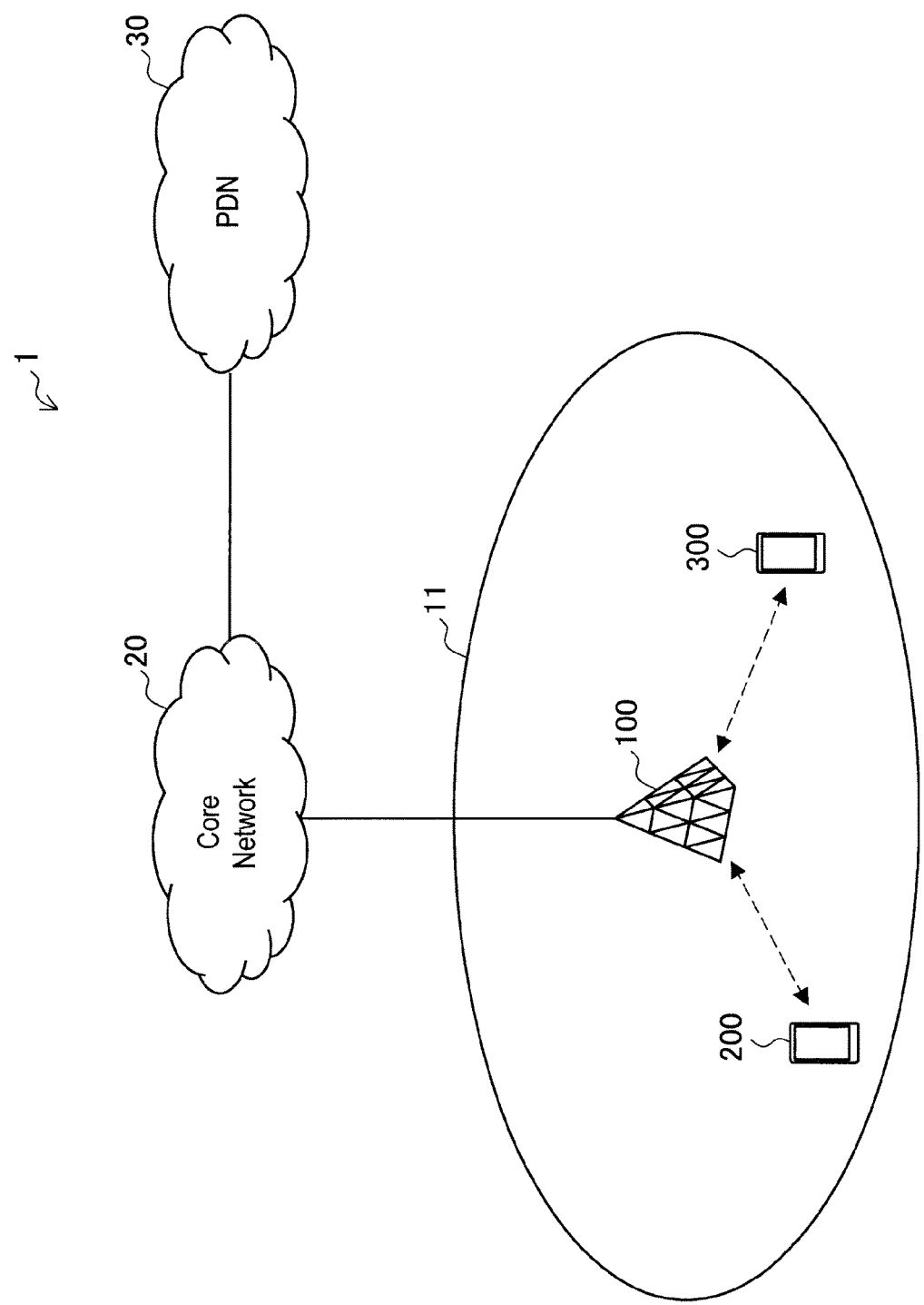
FIG. 1 is a diagram illustrating an overall configuration of a system according to an embodiment of the present disclosure.

FIG. 1 is a diagram illustrating an overall configuration of a system according to an embodiment of the present disclosure. As illustrated in FIG. 1, a system 1 includes a base station apparatus 100, a terminal apparatus 200, a terminal apparatus 300, a core network 20, and a PDN (Packet Data Network) 30.

The base station apparatus 100 operates a cell 11 and provides wireless communication services to one or more terminal apparatuses positioned inside of the cell 11. The cell 11 is operated according to, for example, an arbitrary wireless communication system such as LTE and NR. The base station apparatus 100 is connected to the core network 20. The core network 20 is connected to the PDN 30 through a gateway apparatus (not illustrated).

The core network 20 can include, for example, MME (Mobility Management Entity), S-GW (Serving gateway), P-GW (PDN gateway), PCRF (Policy and Charging Rule Function), and HSS (Home Subscriber Server). The MME is a control node that handles a signal of a control plane, and the MME manages the movement state of the terminal apparatus. The S-GW is a control node that handles a signal of a user plane and is a gateway apparatus that switches the transfer path of user data. The P-GW is a control node that handles a signal of the user plane and is a gateway apparatus as a connection point of the core network 20 and the PDN 30. The PCRF is a control node that performs control regarding the policy and charging, such as QoS (Quality of Service) for bearer. The HSS is a control node that handles member data and that controls services.

The terminal apparatus 200 and the terminal apparatus 300 are communication apparatuses that wirelessly communicate with the base station apparatus 100 based on the control of the base station apparatus 100. The terminal apparatus 200 and the terminal apparatus 300 may be so-called user terminals (UE: User Equipment). For example, the terminal apparatus 200 and the terminal apparatus 300 transmit uplink signals to the base station apparatus 100 and receive downlink signals from the base station apparatus 100.

Particularly, the terminal apparatus 200 is a URLLC terminal that transmits and receives signals of URLLC to and from the base station apparatus 100. The URLLC terminal 200 is equivalent to a first terminal apparatus that performs grant-free transmission of URLLC data (first uplink data). The terminal apparatus 300 is an eMBB terminal that transmits and receives signals of eMBB to and from the base station apparatus 100. The eMBB terminal 300 is equivalent to a second terminal apparatus that performs grant-based transmission of eMBB data (second uplink data). The URLLC terminal 200 and the eMBB terminal 300 will also be referred to as terminal apparatuses in a case where the distinction is not necessary.

<1.2. Related Technique>

Hereinafter, a technique related to the present technique will be described.

(1) Frame Configuration of NR

A frame configuration (in other words, slot format or slot configuration) of NR can be defined by a subframe, a slot, or a mini slot. The subframe includes fourteen symbols, and the subframe can be used to define the frame configuration in reference subcarrier spacing (in other words, prescribed subcarrier spacing). The slot is a symbol period in subcarrier spacing used for communication, and the slot includes seven or fourteen symbols. The number of symbols included in one slot can be set specifically for the cell or specially for the terminal apparatus from the base station apparatus 100. The number of symbols included in the mini slot can be smaller than the number of symbols included in the slot. For example, the number of symbols in one mini slot can be one to six, and the number of symbols can be set specifically for the cell or specifically for the terminal apparatus from the base station apparatus 100. Both the slot and the mini slot can be used as units of resources in the time domain for communication. For example, the slot is used in communication for the eMBB and the mMTC, and the mini slot is used in communication for the URLLC. In addition, the names of the slot and the mini slot may not be distinguished.

Figure 2:
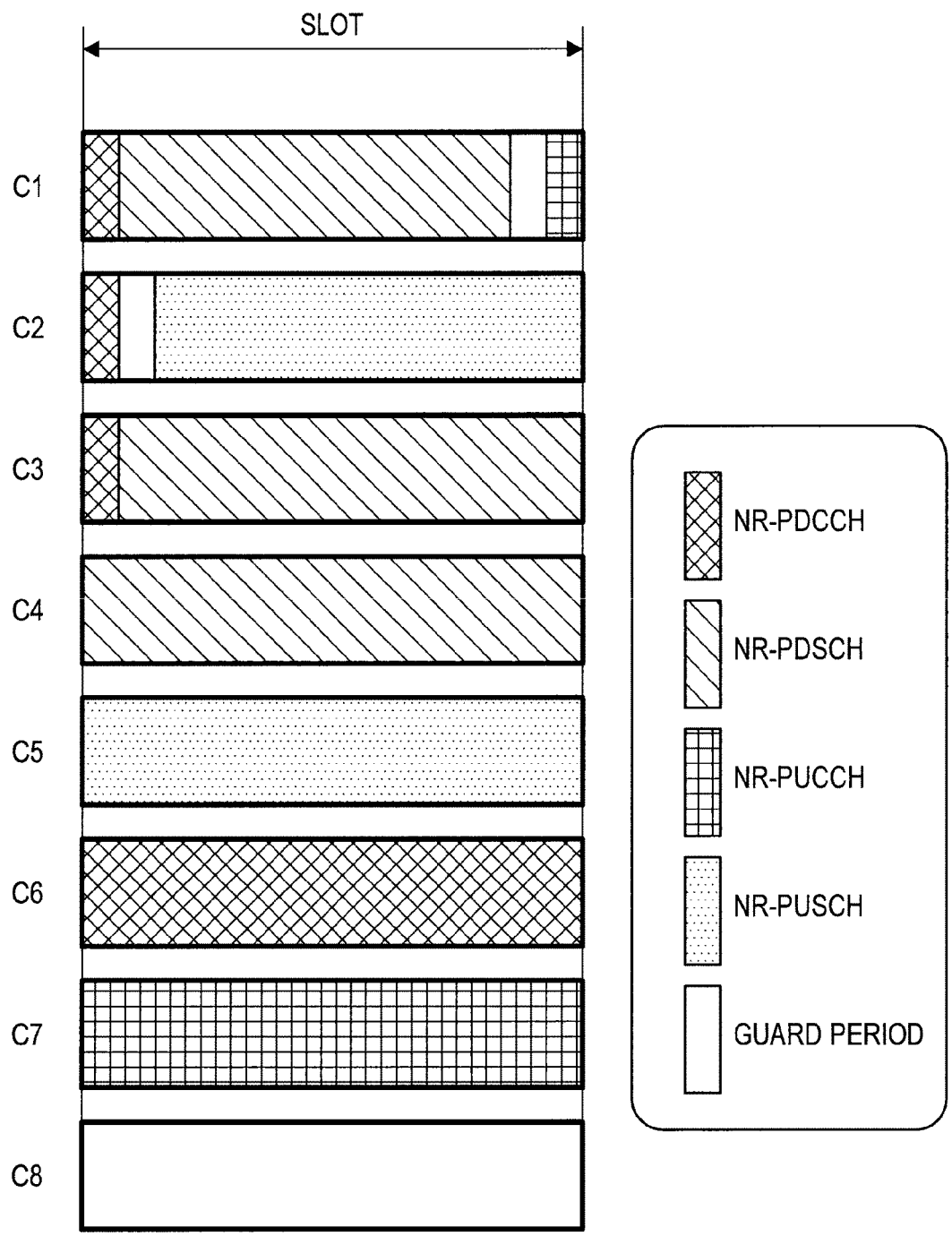
FIG. 2 is a diagram illustrating an example of frame configurations of NR.

FIG. 2 is a diagram illustrating an example of frame configurations of NR. FIG. 2 illustrates frame configurations in a predetermined frequency domain. For example, the predetermined frequency domain includes a resource block, a subband, a system bandwidth, and the like. Therefore, the frame configurations as illustrated in FIG. 2 can be frequency-multiplexed and/or spatially-multiplexed.

In the NR, one slot includes downlink communication, a guard period (GP), and/or downlink communication. The downlink communication includes downlink channels, such as NR-PDCCH (Physical Downlink Control Channel) and/or NR-PDSCH (Physical Downlink Shared Channel). In addition, the downlink transmission includes a reference signal associated with the NR-PDCCH and/or the NR-PDSCH. The uplink communication includes uplink channels, such as NR-PUCCH (Physical Uplink Control Channel) and/or NR-PUSCH (Physical Uplink Shared Channel). In addition, the downlink communication includes a reference signal associated with the NR-PUCCH and/or the NR-PUSCH. The GP is a time domain in which nothing is transmitted. For example, the GP is used to adjust the time to switch from the reception of the downlink communication to the transmission of the uplink communication in the terminal apparatus, the processing time in the terminal apparatus, and/or the transmission timing of the uplink communication.

As illustrated in FIG. 2, the NR can use various frame configurations. A frame configuration C1 includes the NR-PDCCH, the NR-PDSCH, the GP, and the NR-PUCCH. In the NR-PDCCH, allocation information of the NR-PDSCH is transmitted, and HARQ-ACK for the received NR-PDSCH is transmitted through the NR-PUCCH in the same slot. A frame configuration C2 includes the NR-PDCCH, the GP, and the NR-PUSCH. In the NR-PDCCH, allocation information of the NR-PUSCH is transmitted, and the NR-PUSCH is transmitted through an allocated resource in the same slot. The downlink communication and the uplink communication complete within the same slots in the frame configuration, such as the frame configurations C1 and C2, and the frame configuration is also called a self-contained frame.

Frame configurations C3 to C7 are frame configurations including only the downlink communication or the uplink communication. More specifically, the frame configuration C3 includes the NR-PDCCH and the NR-PDSCH. The frame configuration C4 includes the NR-PDSCH. The frame configuration C5 includes the NR-PUSCH. The frame configuration C6 includes the NR-PDCCH. The frame configuration C7 includes the NR-PUCCH. In the frame configuration C3, the NR-PDSCH can be scheduled through the NR-PDCCH in the same slot. In the frame configurations C4 and C5, the NR-PDSCH and the NR-PUSCH can be scheduled through the NR-PDCCH, RRC signaling, or the like mapped in different slots.

A frame configuration C8 is a frame configuration used as a domain, which is a guard period in which there is no communication in the entire slot, or used as a blank slot. In addition, the slot as illustrated in the frame configuration C8 can be used as a slot for extension in the future. A conventional terminal apparatus simply assumes such a slot as a blank slot, and the slot can be used to transmit data or signals to a terminal apparatus corresponding to a new extended technique.

(2) Signal Waveforms

In the present embodiment, a plurality of types of signal waveforms (Waveforms) is prescribed in the uplink. For example, two uplink signal waveforms can be prescribed, and the waveforms can be referred to as a first signal waveform and a second signal waveform. In the present embodiment, the first signal waveform is CP-OFDM (Cyclic Prefix-Orthogonal Frequency Division Multiplexing), and the second signal waveform is SC-FDMA (Single Carrier-Frequency Division Multiple Access). In addition, the second signal waveform is also called DFT-s-OFDM (Discrete Fourier Transform-Spread-Orthogonal Frequency Division Multiplexing).

That is, the first signal waveform is a multi-carrier signal, and the second signal waveform is a single-carrier signal. In addition, the first signal waveform is the same as the downlink signal waveform in the LTE and the NR, and the second signal waveform is the same as the uplink signal waveform in the LTE.

The signal waveforms can vary in terms of power efficiency, transmission efficiency, transmission (generation) method, reception method, resource mapping, and the like. For example, the second signal waveform can reduce the PAPR (Peak-to-Average Power Ratio) compared to the first signal waveform, and the second signal waveform is superior in terms of power efficiency. In addition, the first signal waveform allows frequency multiplexing of a reference signal with data in the frequency direction, and the first signal waveform is superior to the second signal waveform in terms of transmission efficiency. Furthermore, in a case where frequency domain equalization needs to be performed in the reception process for the second signal waveform, the load of the reception process is higher in the second signal waveform than in the first signal waveform. In addition, the first signal waveform has narrower subcarrier spacing than the second signal waveform, and the first signal waveform is easily affected by phase noise, particularly in a high frequency band.

(3) User Multiplexing System

In the orthogonal multiple access (OMA), orthogonal frequency axis and time axis are used for transmission and reception, for example. In this case, the subcarrier spacing determines the frame configuration of frequency and time resources, and resources equal to or greater than the number of resource elements cannot be used.

On the other hand, in the non-orthogonal multiple access (NOMA), a non-orthogonal axis (non-orthogonal resources) is used in addition to the orthogonal frequency axis and time axis (orthogonal resources) to determine the frequency configuration. For example, the non-orthogonal resources include an interleave pattern, a spreading pattern, a scrambling pattern, a codebook, and power. In a case of using the non-orthogonal multiple access to perform user multiplexing, the receiver side can use an interference canceller based on the non-orthogonal resource pattern applied to each multiplexed signal to separate the multiplexed signal.

For example, each terminal apparatus applies a non-orthogonal resource pattern corresponding to the uplink transmission. The non-orthogonal resource pattern is also called MA signature (Multiple Access signature). The signal after the application of the MA signature is transmitted from each terminal apparatus through the same frequency and time resources. Here, the MA signature includes, for example, an interleave pattern, a spreading pattern, a scrambling pattern, a codebook, power allocation, and the like. Note that the non-orthogonal resource pattern may be simply called a pattern or an index instead of the MA signature. In that case, the non-orthogonal resource pattern indicates, for example, an identifier, such as a pattern and an index, used in the NOMA as described above or indicates the pattern itself.

(4) Resource Configurations of eMBB and URLLC

In the NR, data with different TTI (Transmission Time Interval) lengths can be flexibly transmitted as in the eMBB and the URLLC. The TTI length as a unit of transmission of the eMBB terminal 300 is provided by an eMBB slot (transmission frame of eMBB, also referred to as eMBB frame), and the TTI length as a unit of transmission of the URLLC terminal 200 is provided by a URLLC slot (transmission frame of URLLC, also referred to as URLLC frame). The time length of the URLLC slot (URLLC slot length) is shorter than the time length of the eMBB slot (eMBB slot length). Hereinafter, the URLLC slot and the eMBB slot will also be simply referred to as slots.

The URLLC slot and the eMBB slot are prescribed or set by the numbers of symbols and/or the symbol lengths. Here, the symbol length is the time length of one symbol and is determined in relation to the subcarrier spacing in the OFDM signal. Specifically, in a case where the subcarrier spacing is n-fold, the symbol length is one-nth.

Figure 3:
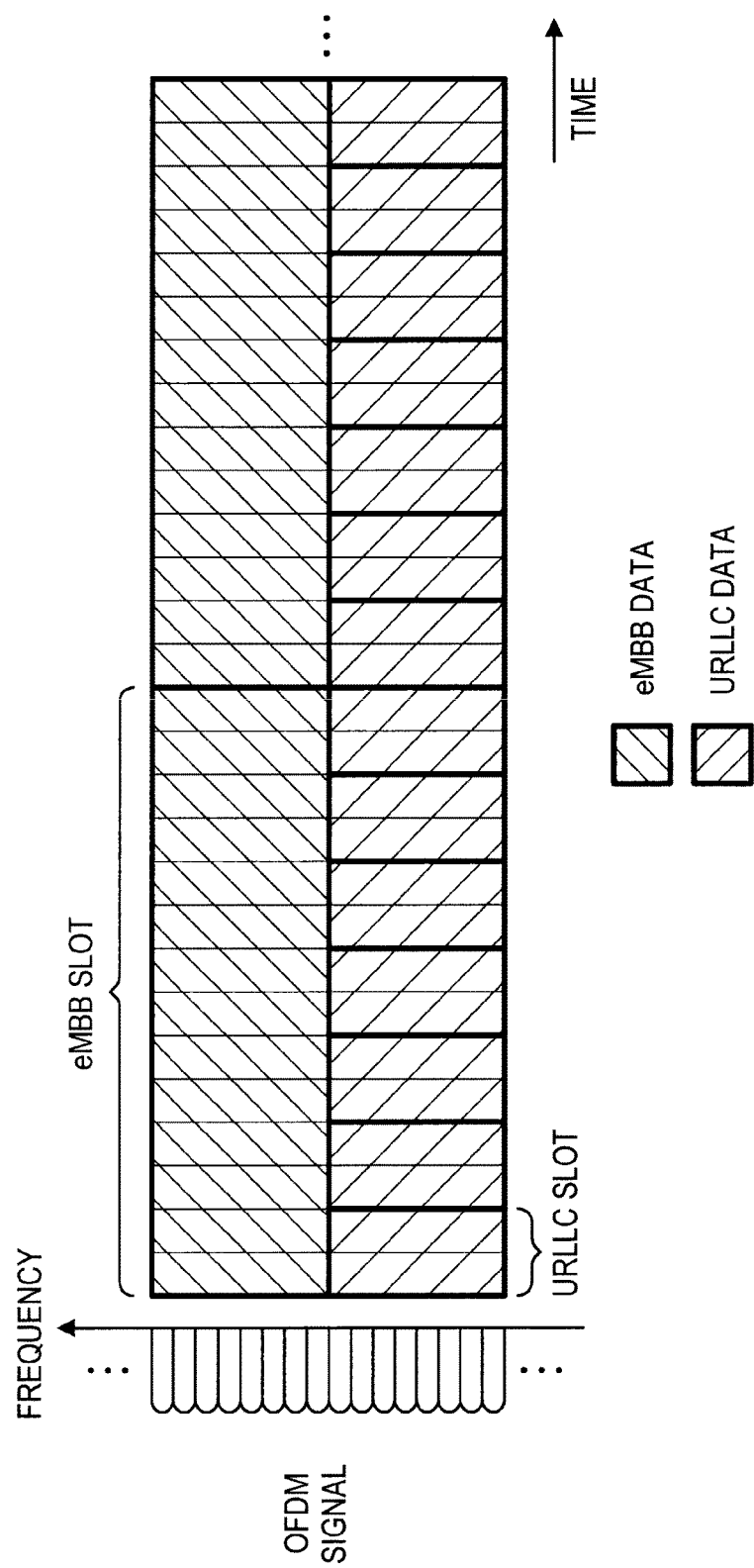
FIG. 3 is a diagram illustrating an example of a configuration of an eMBB slot and a URLLC slot.

For example, the URLLC slot and the eMBB slot have the same symbol length and are determined by different numbers of symbols. Specifically, the URLLC slot includes two symbols, and the eMBB slot includes seven or fourteen symbols. FIG. 3 is a diagram illustrating an example of a configuration of the eMBB slot and the URLLC slot. In the example illustrated in FIG. 3, the URLLC slot and the eMBB slot have the same symbol length. The eMBB slot includes fourteen symbols, and the URLLC slot includes two symbols.

In addition, for example, the URLLC slot and the eMBB slot have the same number of symbols and are determined by different symbol lengths (that is, different subcarrier spacing). Specifically, the eMBB slot includes seven symbols and provides an OFDM signal at subcarrier spacing of 15 kHz. The URLLC slot includes seven symbols and provides an OFDM signal at subcarrier spacing of 60 kHz. In this case, the URLLC slot length is one fourth of the eMBB slot length.

(5) Grant-Based Transmission and Grant-Free Transmission

The eMBB terminal 300 performs grant-based transmission in the uplink. The grant-based transmission is a transmission method of receiving allocation of resources from the base station apparatus 100 every time data to be transmitted is generated. More specifically, the eMBB terminal 300 receives allocation of uplink resources for grant-based transmission (hereinafter, also referred to as grant-based transmission resources) from the base station apparatus 100 at timing of the generation of the data to be transmitted. In addition, the eMBB terminal 300 uses the allocated grant-based transmission resources to transmit the data.

The grant-based transmission resources are dynamically set through a control channel and the like.

The URLLC terminal 200 performs grant-free transmission in the uplink. The grant-free transmission is a method of receiving the allocation of resources from the base station apparatus 100 in advance and using the allocated resources to transmit the data in a case where the data to be transmitted is generated. More specifically, the base station apparatus 100 allocates predetermined uplink resources for grant-free transmission (hereinafter, also referred to as grant-free transmission available resources) to the URLLC terminal 200. In the case where the data of uplink transmission is generated, the URLLC terminal 200 selects resources to be used for the transmission from among the grant-free transmission available resources and uses the selected resources to transmit the data.

The grant-free transmission available resources are statically or quasi-statically set as information specific to the base station apparatus 100 or the URLLC terminal 200 through RRC signaling. The grant-free transmission available resources can be set by periodic resources determined by a predetermined period and/or determined by a predetermined offset, URLLC slots continuous from a predetermined start position, and the like in the time direction.

Hereinafter, flows of the grant-based transmission and the grant-free transmission will be described with reference to FIGS. 4 and 5.

Figure 4:
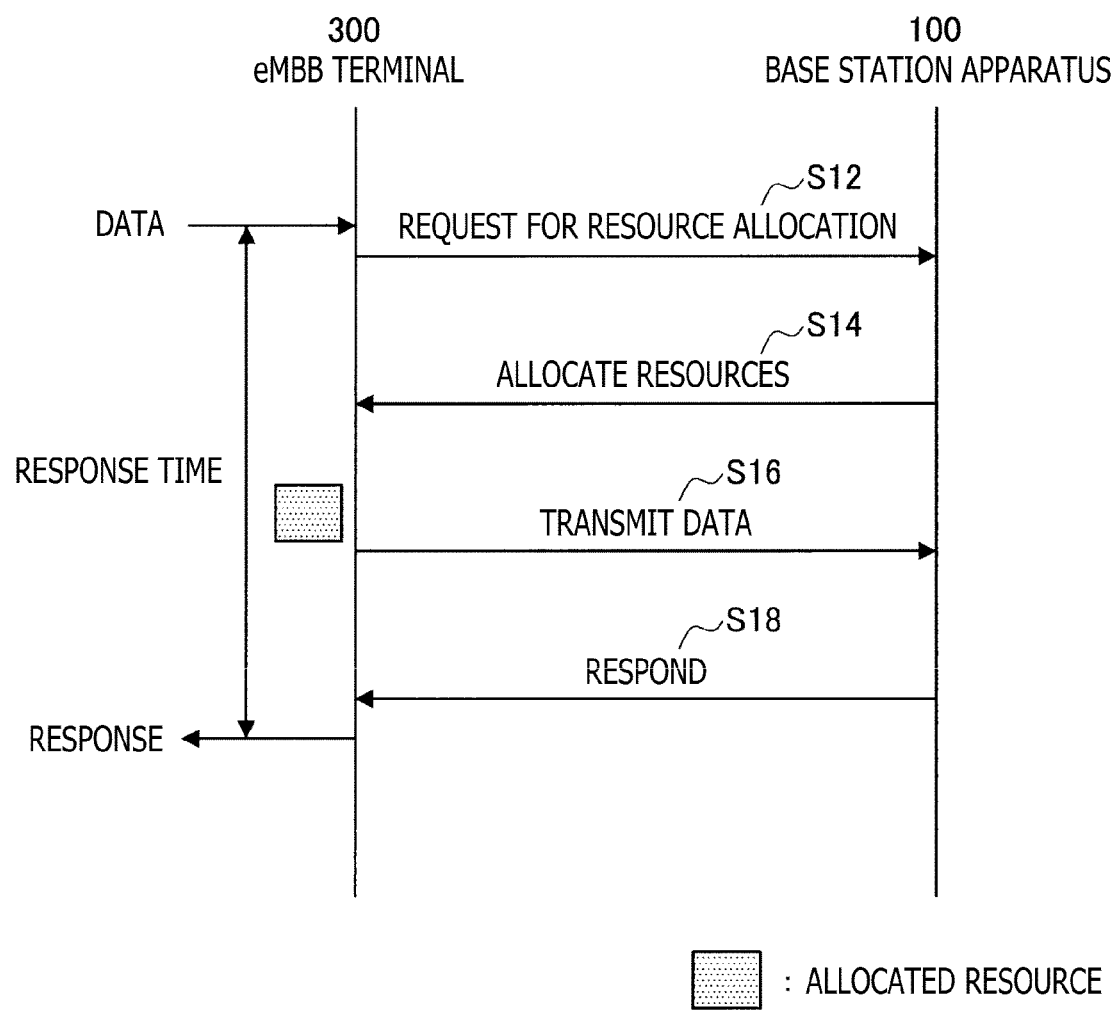
FIG. 4 is a sequence diagram illustrating an example of a flow of a grant-based transmission process of a base station apparatus 100 and an eMBB terminal 300 according to the present embodiment.

FIG. 4 is a sequence diagram illustrating an example of a flow of the grant-based transmission process of the base station apparatus 100 and the eMBB terminal 300 according to the present embodiment. As illustrated in FIG. 4, the eMBB terminal 300 first issues a resource allocation request to the base station apparatus 100 when data to be transmitted is generated through user input or the like (step S12). Next, the base station apparatus 100 performs resource allocation (step S14). Furthermore, the eMBB terminal 300 uses the resources allocated from the base station apparatus 100 in step S14 to transmit the data (step S16). Next, the base station apparatus 100 receives the data and returns a response, such as ACK/NACK, to the eMBB terminal 300 (step S18). Next, the eMBB terminal 300 outputs the received response to the user or the like.

Figure 5:
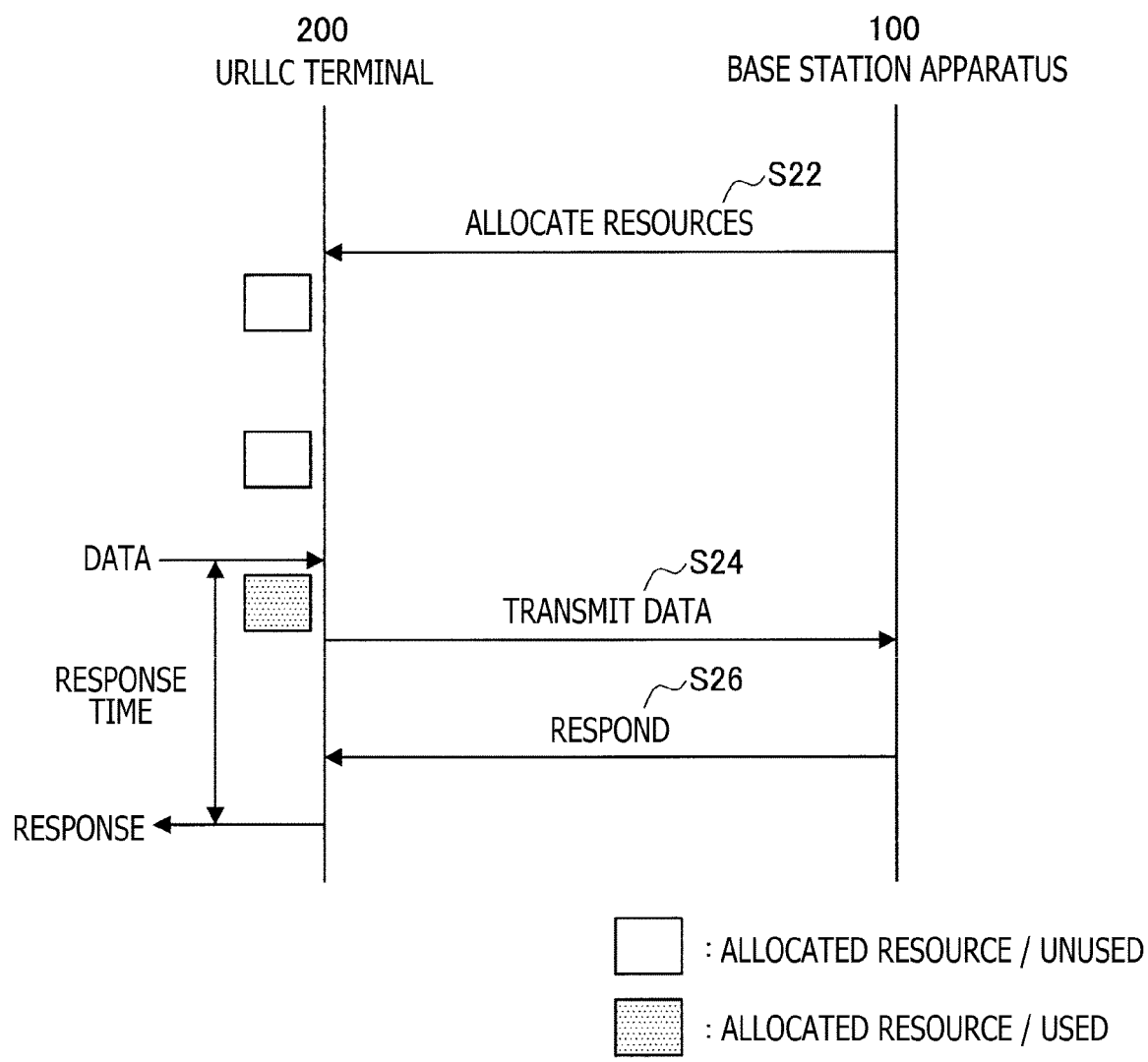
FIG. 5 is a sequence diagram illustrating an example of a flow of a grant-free transmission process of the base station apparatus 100 and a URLLC terminal 200 according to the present embodiment.

FIG. 5 is a sequence diagram illustrating an example of a flow of the grant-free transmission process of the base station apparatus 100 and the URLLC terminal 200 according to the present embodiment. As illustrated in FIG. 5, the base station apparatus 100 first performs resource allocation (step S22). The resources allocated here are grant-free transmission available resources. The URLLC terminal 200 does not use the allocated grant-free transmission available resources until data to be transmitted is generated. When data to be transmitted is generated through user input or the like, the URLLC terminal 200 uses the allocated grant-free transmission available resources to transmit the data (step S24). Next, the base station apparatus 100 receives the data and returns a response, such as ACK/NACK, to the base station apparatus 100 (step S26). Next, the URLLC terminal 200 outputs the received response to the user or the like.

Comparing FIGS. 4 and 5, the time from the generation of the data to be transmitted to the completion of the transmission or the response time from the generation of the data to be transmitted to the acquisition of the response is shorter in the grant-free transmission than in the grant-based transmission. Therefore, communication with lower delay can be realized in the grant-free transmission.

2. Configuration Example of Each Apparatus

<2.1. Configuration Example of Base Station Apparatus>

Figure 6:
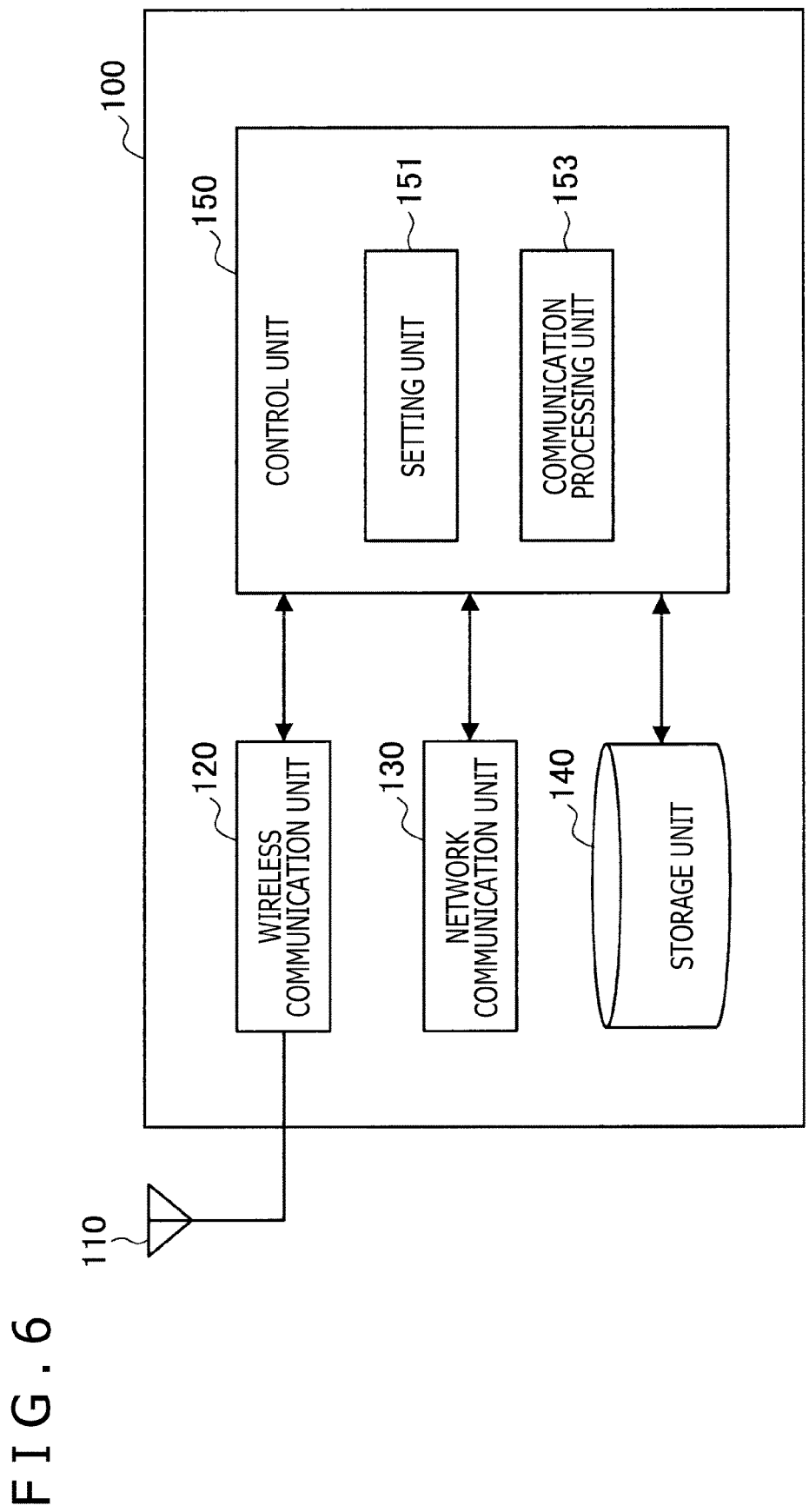
FIG. 6 is a block diagram illustrating an example of a configuration of the base station apparatus 100 according to the present embodiment.

FIG. 6 is a block diagram illustrating an example of a configuration of the base station apparatus 100 according to the present embodiment. With reference to FIG. 6, the base station apparatus 100 includes an antenna unit 110, a wireless communication unit 120, a network communication unit 130, a storage unit 140, and a control unit 150.

(1) Antenna Unit 110

The antenna unit 110 emits a signal, which is output by the wireless communication unit 120, as a radio wave into the space. In addition, the antenna unit 110 converts a radio wave in the space into a signal and outputs the signal to the wireless communication unit 120.

(2) Wireless Communication Unit 120

The wireless communication unit 120 transmits and receives signals. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to other nodes and receives information from other nodes. For example, the other nodes include another base station and another core network node.

(4) Storage Unit 140

The storage unit 140 temporarily or permanently stores a program and various types of data for the operation of the base station apparatus 100.

(5) Control Unit 150

The control unit 150 controls the operation of the entire base station apparatus 100 to provide various functions of the base station apparatus 100. The control unit 150 includes a setting unit 151 and a communication processing unit 153.

The setting unit 151 has a function of statically or quasi-statically performing setting of the terminal apparatus. Particularly, in relation to the URLLC terminal 200, the setting unit 151 transmits setting information regarding the grant-free transmission available resources to allocate the grant-free transmission available resources to the URLLC terminal 200. In addition, the setting information may also include scramble information described later, a bit position corresponding to a specific URLLC terminal 200 in a common control channel, a notification period of the grant-free transmission parameter information, an application period of the grant-free transmission parameter information, and the like. The setting unit 151 transmits the setting information including these pieces of information to the URLLC terminal 200 to perform the setting of the URLLC terminal 200. The static or quasi-static setting by the setting unit 151 can be performed through, for example, RRC signaling.

The communication processing unit 153 has a function of dynamically controlling the terminal apparatus to communicate with the terminal apparatus. Particularly, in relation to the URLLC terminal 200, the communication processing unit 153 transmits grant-free transmission parameter information described later to the URLLC terminal 200 to communicate with the URLLC terminal 200 based on the grant-free transmission parameter information. More specifically, the base station apparatus 100 receives URLLC data transmitted by the URLLC terminal 200 based on the grant-free transmission parameter information. In relation to the eMBB terminal 300, the communication processing unit 153 transmits grant-based transmission parameter information described later to the eMBB terminal 300 to communicate with the eMBB terminal 300 based on the grant-based transmission parameter information. More specifically, the base station apparatus 100 receives eMBB data transmitted by the eMBB terminal 300 based on the grant-based transmission parameter information. Note that the parameter information is dynamically transmitted and is transmitted through, for example, a control channel.

The control unit 150 can further include constituent elements other than these constituent elements. That is, the control unit 150 can also perform operations other than the operations of these constituent elements.

<2.2. Configuration Example of URLLC Terminal>

Figure 7:
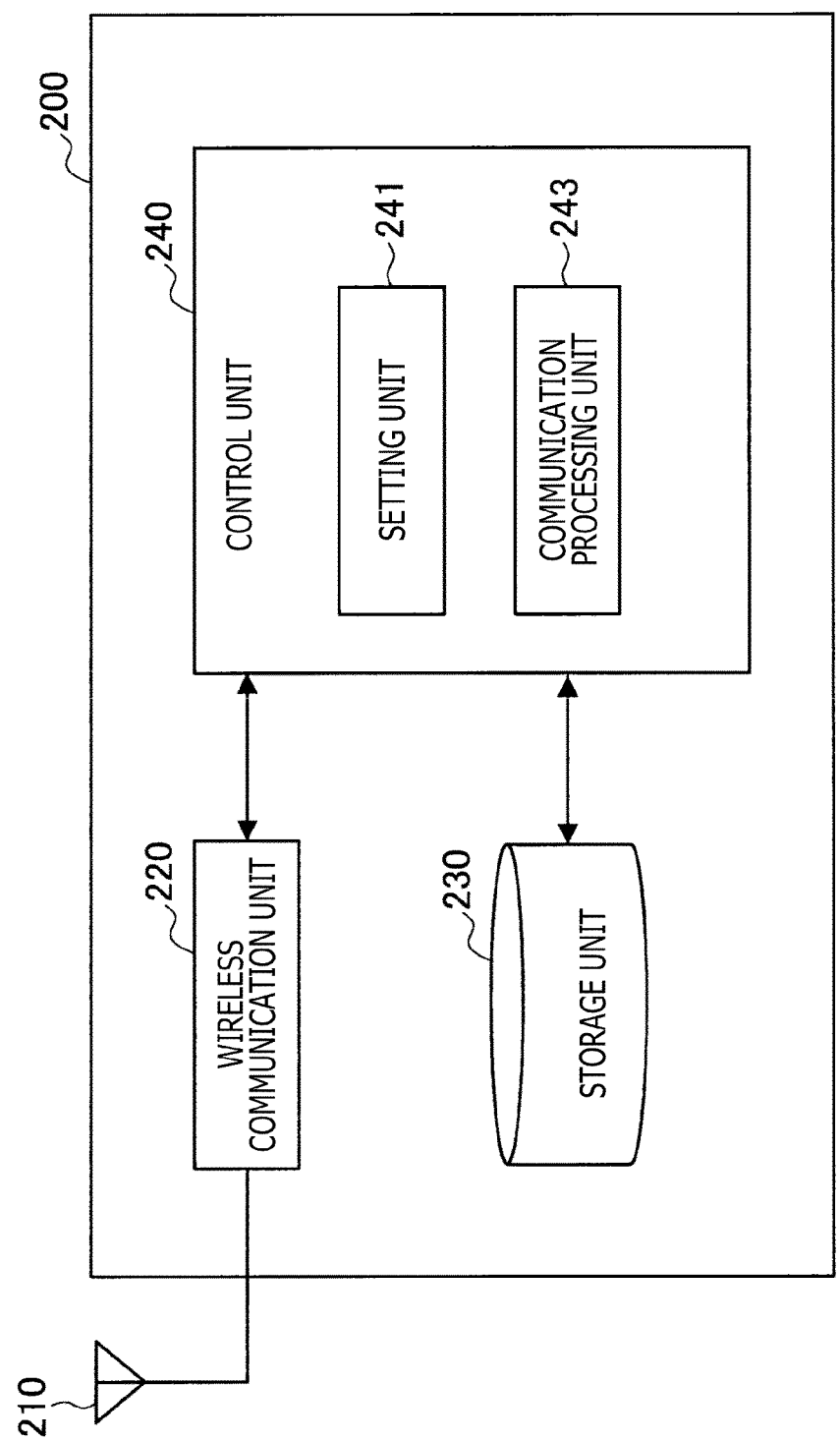
FIG. 7 is a block diagram illustrating an example of a configuration of the URLLC terminal 200 according to the present embodiment.

FIG. 7 is a block diagram illustrating an example of a configuration of the URLLC terminal 200 according to the present embodiment. With reference to FIG. 7, the URLLC terminal 200 includes an antenna unit 210, a wireless communication unit 220, a storage unit 230, and a control unit 240.

(1) Antenna Unit 210

The antenna unit 210 emits a signal, which is output by the wireless communication unit 220, as a radio wave into the space. In addition, the antenna unit 210 converts a radio wave in the space into a signal and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores a program and various types of data for the operation of the URLLC terminal 200.

(4) Control Unit 240

The control unit 240 controls the operation of the entire URLLC terminal 200 to provide various functions of the URLLC terminal 200. The control unit 240 includes a setting unit 241 and a communication processing unit 243.

The setting unit 241 has a function of accepting static or quasi-static setting from the base station apparatus 100. More specifically, the setting unit 241 performs setting regarding the grant-free transmission available resources based on setting information received from the base station apparatus 100. In addition, the setting information can also include scramble information described later, a bit position corresponding to a specific URLLC terminal 200 in a common control channel, a notification period of the grant-free transmission parameter information, an application period of the grant-free transmission parameter information, and the like. The setting unit 241 can also perform the setting based on the received setting information.

The communication processing unit 243 has a function of communicating with the base station apparatus 100 based on dynamic control of the base station apparatus 100. More specifically, the communication processing unit 243 communicates with the base station apparatus 100 based on grant-free transmission parameter information described later received from the base station apparatus 100.

The control unit 240 can further include constituent elements other than these constituent elements. That is, the control unit 240 can performs operations other than the operations of these constituent elements.

3. Technical Features

Hereinafter, technical features of the present embodiment will be described.

Note that hereinafter, "prescribing" denotes defining a specification in a standard. In addition, "setting" denotes quasi-static instruction through RRC signaling or the like or dynamic instruction through a control channel or the like.

<3.1. Dynamic Resource Sharing>

The URLLC terminal 200 performs the grant-free transmission, and the grant-free transmission available resources may include resources not actually used for the transmission. Therefore, in a case where the URLLC terminal 200 occupies resources allocated as grant-free transmission available resources to the URLLC terminal 200, the resources not used by the URLLC terminal 200 are wasted. As a result, the use efficiency of the uplink resources is reduced.

Therefore, the system 1 according to the present embodiment performs dynamic resource sharing of the grant-free transmission available resources and the grant-based transmission resources. Specifically, the eMBB data is transmitted by using orthogonal resources (frequency and time) at least partially the same as the grant-free transmission available resources. In other words, the base station apparatus 100 allocates at least part of the grant-free transmission available resources as grant-based transmission resources to the eMBB terminal 300. In this way, the resources not actually used for the transmission of the grant-free transmission available resources are used for the transmission of the eMBB data, and the use efficiency of the uplink resources can be improved. This will be described with reference to FIG. 8.

FIG. 8 is a diagram for describing an example of dynamic resource sharing according to the present embodiment. The vertical axis of FIG. 8 indicates the frequency, and the horizontal axis indicates the time. As illustrated in FIG. 8, the base station apparatus 100 allocates grant-free transmission available resources 50 to the URLLC terminal 200. The URLLC terminal 200 selects uplink resources to be used from among the allocated grant-free transmission available resources 50 and uses the selected uplink resources to perform uplink transmission of the URLLC data. On the other hand, the URLLC terminal 200 does not use uplink resources not selected from among the allocated grant-free transmission available resources 50. In the example illustrated in FIG. 8, unused resources 51 are resources not used for the transmission of the URLLC data, and used resources 52 are resources not used for the transmission of the URLLC data.

As illustrated in FIG. 8, the base station apparatus 100 allocates grant-based transmission resources 60 that are uplink resources including the grant-free transmission available resources 50 to the eMBB terminal 300. That is, the base station apparatus 100 allocates the grant-free transmission available resources 50 and the grant-based transmission resources 60 together (overlapped). The eMBB terminal 300 typically uses the entire grant-based transmission resources 60, that is, also uses the unused resources 51, to perform the uplink transmission of the eMBB data. The unused resources 51 not used for the transmission of the URLLC data are used for the transmission of the eMBB data, and the use efficiency of the uplink resources can be improved. Furthermore, the flexibility of scheduling in the uplink resources can be increased.

Note that the grant-free transmission available resources 50 include unit resources including, for example, predetermined frequency resources (such as subcarriers and resource blocks) and predetermined time resources (such as symbols and URLLC frames). In the example illustrated in FIG. 8, the grant-free transmission available resources 50 include one unit resource in the frequency direction and seven unit resources in the time direction in a predetermined eMBB frame. The present technique is not limited to the example, and, for example, two or more unit resources may be included in the frequency direction. In addition, the present technique may include, for example, almost permanent unit resources in the time direction.

In the used resources 52 of the grant-free transmission available resources 50, uplink transmission of both the URLLC data and the eMBB data is performed. Therefore, there may be an interference between the URLLC data and the eMBB data. The eMBB data may not be always transmitted by using all of the uplink resources. This will be described with reference to FIG. 9.

Figure 9:
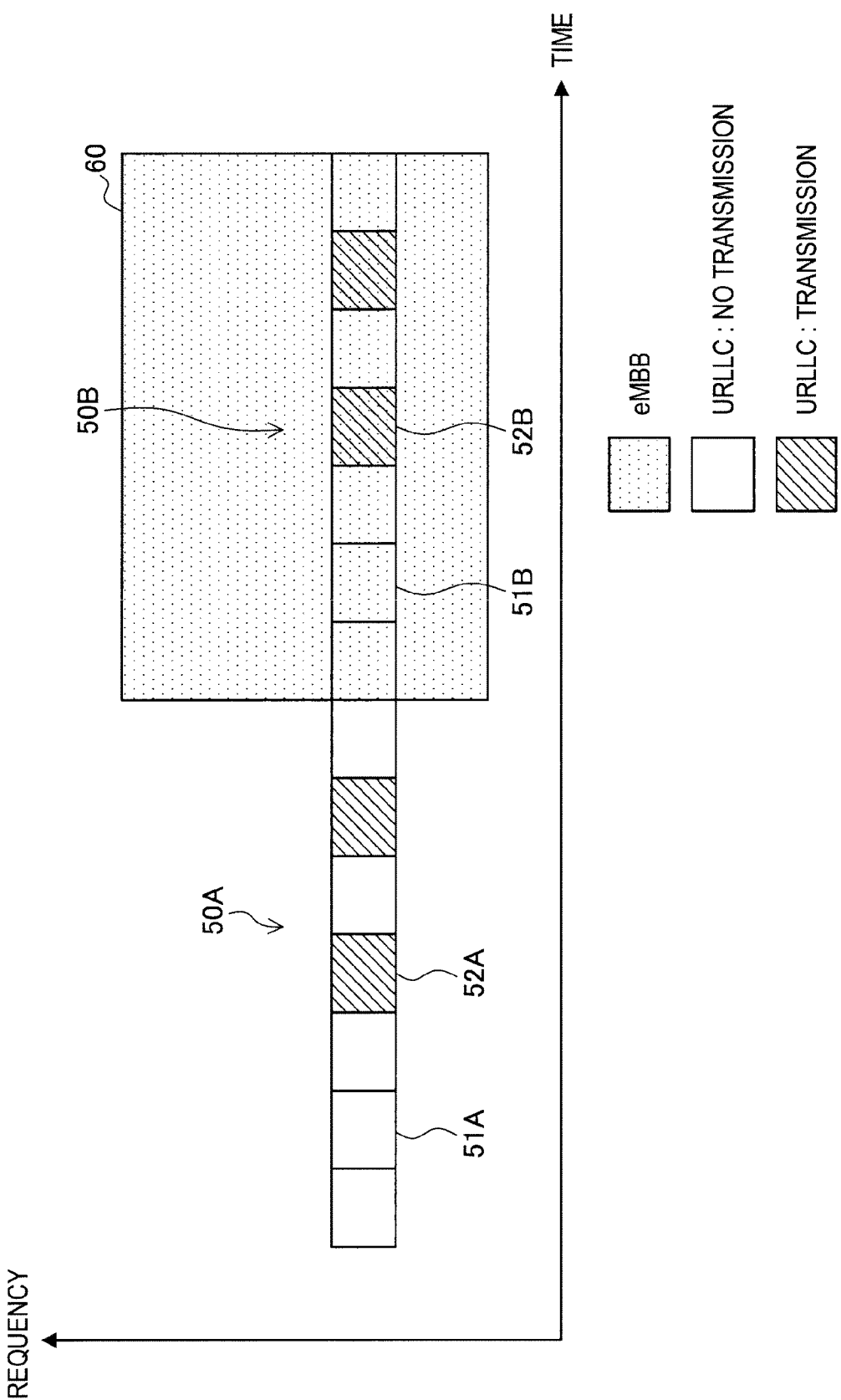
FIG. 9 is a diagram for describing an example of the dynamic resource sharing according to the present embodiment.

FIG. 9 is a diagram for describing an example of dynamic resource sharing according to the present embodiment. The vertical axis of FIG. 9 indicates the frequency, and the horizontal axis indicates the time. As illustrated in FIG. 9, grant-free transmission available resources 50A do not overlap with the grant-based transmission resources. On the other hand, grant-free transmission available resources 50B overlap with the grant-based transmission resources 60. Therefore, the eMBB data does not cause an interference in the URLLC data transmitted by using used resources 52A. On the other hand, the eMBB data causes an interference in the URLLC data transmitted by using used resources 52B.

The transmission quality of the URLLC data varies depending on whether or not there is an interference caused by the eMBB data. Therefore, an optimal value of parameter information for transmitting the URLLC data (hereinafter, also referred to as grant-free transmission parameter information) varies depending on whether or not there is an interference. However, in typical grant-free transmission, the grant-free transmission parameter information is quasi-statically set through RRC signaling along with the grant-free transmission available resources. Therefore, although whether or not there is an interference may vary between eMBB frames, the grant-free transmission parameter information does not vary in accordance with whether or not there is an interference. As a result, the transmission efficiency of the URLLC data is deteriorated.

Therefore, the base station apparatus 100 dynamically switches the grant-free transmission parameter information according to whether or not there is an interference, that is, according to whether or not there is an overlap of the grant-free transmission available resources and the grant-based transmission resources. More specifically, the base station apparatus 100 first communicates with the eMBB terminal 300 (for example, receives a resource allocation request from the eMBB terminal 300) to figure out the timing that the interference may occur (that is, the timing of the uplink transmission of the eMBB data). Furthermore, the base station apparatus 100 sets first grant-free transmission parameter information suitable for a case without interference in a period without interference and sets second grant-free transmission parameter information suitable for a case with interference in a period with interference.

Although there are two pieces of information including the first grant-free transmission parameter information and the second grant-free transmission parameter information in the description of the present specification, the present technique is not limited to the example. For example, there may be three or more pieces of grant-free transmission parameter information. For example, the grant-free transmission parameter information may be switched according to the magnitude of the interference among the three or more pieces of grant-free transmission parameter information. In addition, the adaptive control of the grant-free transmission parameter information is not limited to the adaptive control based on the magnitude of interference. The adaptive control may also be performed based on various factors such as scheduling of the base station apparatus 100 and other terminal apparatuses.

The base station apparatus 100 uses, for example, a downlink control channel for transmission at a predetermined period to notify the grant-free transmission parameter information. The URLLC terminal 200 applies the grant-free transmission parameter information notified through the predetermined downlink control channel to predetermined grant-free transmission available resources. In the grant-free transmission available resources to be applied, the URLLC terminal 200 uses the notified grant-free transmission parameter information to perform the grant-free transmission. This will be described with reference to FIGS. 10 and 11.

Figure 10:
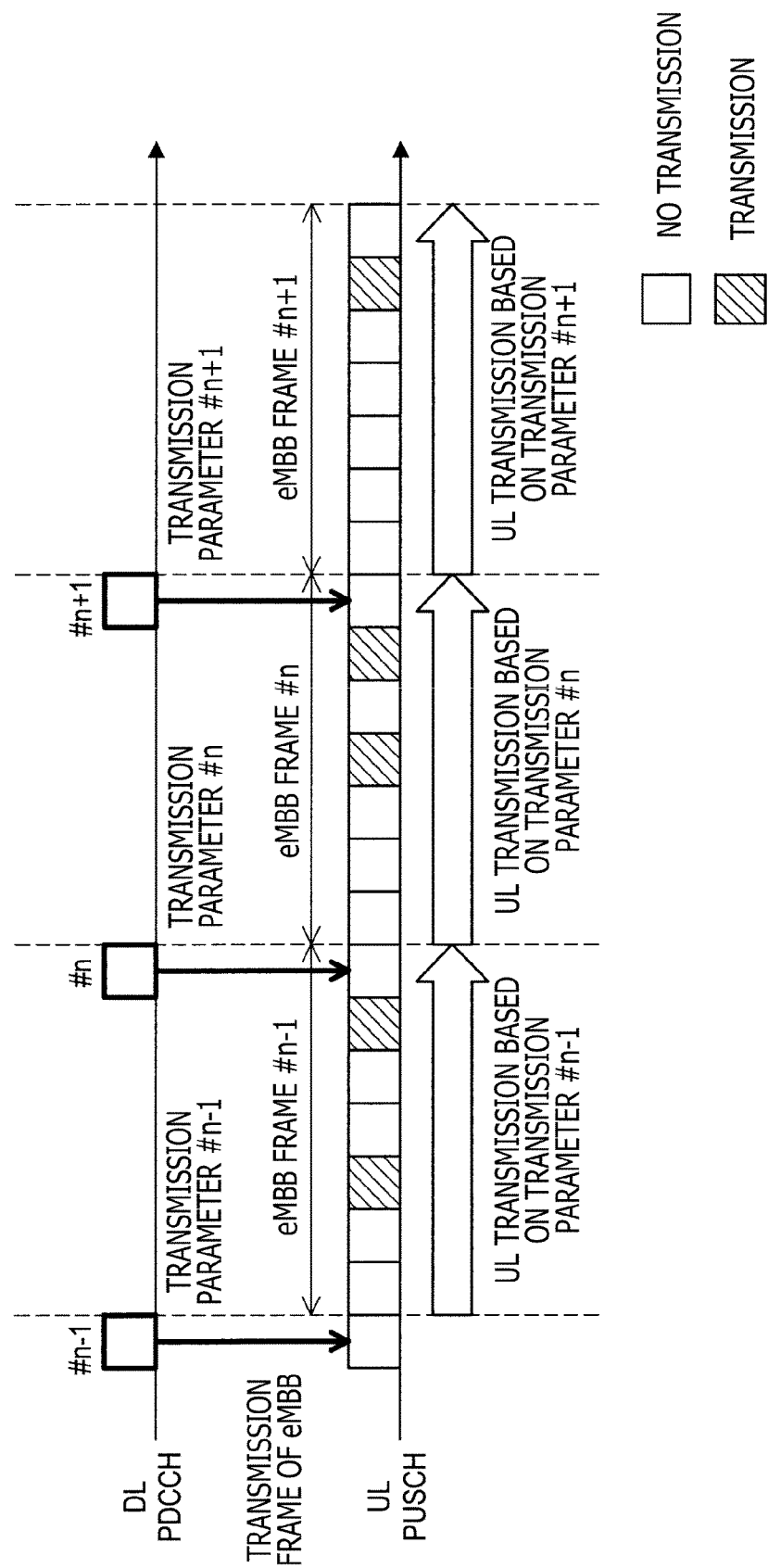
FIG. 10 is a diagram for describing a setting process of grant-free transmission parameter information according to the present embodiment.

FIG. 10 is a diagram for describing a setting process of the grant-free transmission parameter information according to the present embodiment. As illustrated in FIG. 10, the base station apparatus 100 notifies grant-free transmission parameter information #n to be applied in the uplink (PUSCH) of an eMBB frame #n through the downlink control channel (PDCCH) of an eMBB frame #n−1. In this case, the base station apparatus 100 notifies the first or second grant-free transmission parameter information as the grant-free transmission parameter information #n according to whether or not the eMBB data is to be transmitted in the eMBB frame #n. Furthermore, the URLLC terminal 200 uses the grant-free transmission parameter information #n notified through the downlink control channel of the eMBB frame #n−1 to perform the grant-free transmission in the uplink of the eMBB frame #n. Such a process allows the URLLC terminal 200 to perform optimal grant-free transmission according to whether or not there is an interference. This is similar for the frames other than the eMBB frame #n.

Figure 11:
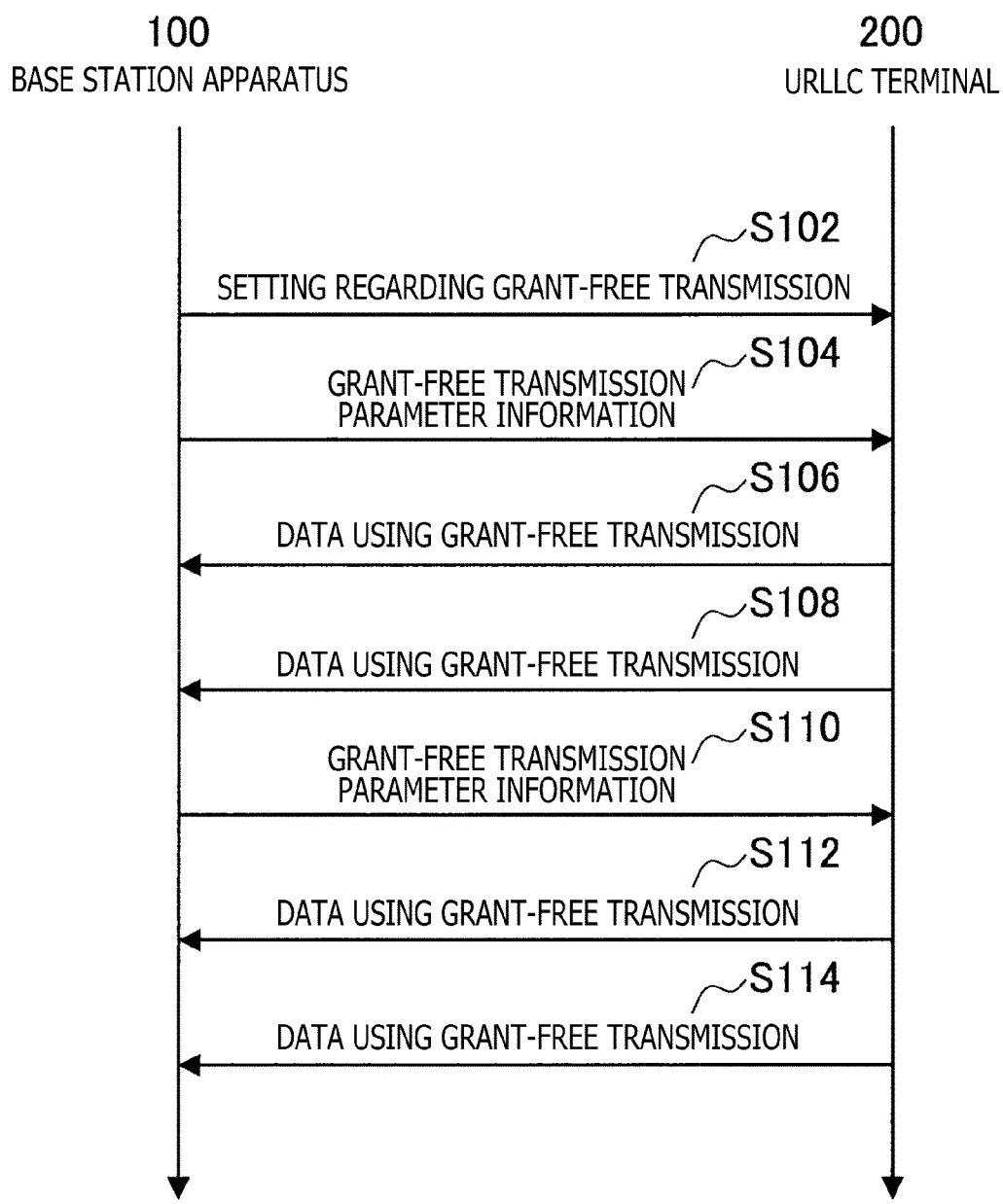
FIG. 11 is a sequence diagram for describing an example of a flow of the setting process of the grant-free transmission parameter information according to the present embodiment.

FIG. 11 is a sequence diagram for describing an example of a flow of the setting process of the grant-free transmission parameter information according to the present embodiment. The present sequence involves the base station apparatus 100 and the URLLC terminal 200. As illustrated in FIG. 11, the base station apparatus 100 first uses RRC signaling to perform setting in the URLLC terminal 200 regarding the grant-free transmission (step S102). The setting regarding the grant-free transmission here includes at least information indicating the allocation of the grant-free transmission available resources. Next, the base station apparatus 100 notifies the URLLC terminal 200 of the grant-free transmission parameter information (step S104). Next, the URLLC terminal 200 uses the notified grant-free transmission parameter information to perform the grant-free transmission of the uplink data (steps S106 and S108). The subsequent process (steps S110 to S114) is a repetition of steps S104 to S108.

Although the dynamic resource sharing has been described above in relation to one base station apparatus 100 as well as the URLLC terminal 200 and the eMBB terminal 300 in the coverage of the base station apparatus 100 as illustrated in FIG. 1, the present technique is not limited to the example. For example, the dynamic resource sharing may be performed in relation to a plurality of adjacent base station apparatuses 100 as well as the URLLC terminal 200 and the eMBB terminal 300 at cell edges of the base station apparatuses 100. Specifically, the grant-free transmission parameter information to be applied to the URLLC terminal 200 may be dynamically switched according to whether or not there is an interference between the URLLC terminal 200 and the eMBB terminal 300 that communicate with different base station apparatuses 100.

<3.2. Parameter Information>

The parameter information may be parameter information, such as an absolute value, that can be used alone or may be information, such as a relative value, that can be used in relation to reference information. In the latter case, the parameter information is information indicating a difference from the reference information (for example, a prescribed value, a value set through RRC signaling, or a latest value).

<3.2.1. Grant-Free Transmission Parameter Information>

The grant-free transmission parameter information is used for the uplink data of grant-free transmission. The base station apparatus 100 generates grant-free transmission parameter information and transmits the grant-free transmission parameter information to the URLLC terminal 200. The URLLC terminal 200 generates URLLC data based on the received grant-free transmission parameter information and transmits the URLLC data to the base station apparatus 100.

The base station apparatus 100 sets different grant-free transmission parameter information according to whether or not there is an interference, that is, according to whether or not there is an overlap of the grant-free transmission available resources and the grant-based transmission resources. More simply, the grant-free transmission parameter information is determined based on whether or not there is eMBB data. For example, the base station apparatus 100 sets the first grant-free transmission parameter information in the URLLC terminal 200 in a case where there is no interference, that is, in a case where there is no overlap of the grant-free transmission available resources and the grant-based transmission resources. On the other hand, the base station apparatus 100 sets the second grant-free transmission parameter information in the URLLC terminal 200 in a case where there is an interference, that is, in a case where there is an overlap of the grant-free transmission available resources and the grant-based transmission resources.

The grant-free transmission information is one of the pieces of information described below or is information including a combination of the pieces of information.

(1) Modulation System and/or Encoding Rate

The grant-free transmission parameter information may be information regarding a modulation system and/or an encoding rate used for the uplink data of the grant-free transmission.

For example, the first grant-free transmission parameter information indicates a modulation system and/or an encoding rate with relatively high use efficiency (that is, a modulation system of high modulation order and/or a high encoding rate). The second grant-free transmission parameter information indicates a modulation system and/or an encoding rate with relatively low use efficiency (that is, a modulation system of low modulation order and/or a low encoding rate).

As a result of the switch, the first grant-free transmission parameter information allows transmission with high transmission efficiency in the case where there is no interference. The second grant-free transmission parameter information allows transmission with high resistance to interference in the case where there is an interference.

(2) Transmission Power

The grant-free transmission parameter information may be information regarding the transmission power used for the uplink data of the grant-free transmission.

For example, the first grant-free transmission parameter information indicates relatively low transmission power. The second grant-free transmission parameter information indicates relatively high transmission power.

As a result of the switch, the first grant-free transmission parameter information reduces unnecessary transmission power in the case where there is no interference, and the power consumption of the terminal can be reduced. The second grant-free transmission parameter information allows transmission with high resistance to interference in the case where there is an interference.

(3) The Number of Layers (the Number of Spatially Multiplexed Signals)

The grant-free transmission parameter information may be information regarding the number of layers (the number of spatially multiplexed signals, the number of MIMO signals) used for the uplink data of the grant-free transmission.

For example, the first grant-free transmission parameter information indicates a relatively large number of layers, and the second grant-free transmission parameter information indicates a relatively small number of layers. In addition, for example, the first parameter indicates that the number of layers is one or more, and the second transmission parameter indicates that the number of layers is only one.

As a result of the switch, the first grant-free transmission parameter information allows transmission with high transmission efficiency in the case where there is no interference. The second grant-free transmission parameter information allows transmission with high resistance to interference in the case where there is an interference.

(4) Transmission Method Regarding Spatial Domain

The grant-free transmission parameter information may be information related to the transmission method regarding the spatial domain used for the uplink data of the grant-free transmission. The transmission method regarding the spatial domain includes MIMO (Multiple Input Multiple Output) transmission and transmit diversity such as SFBC (space frequency block coding).

For example, the first grant-free transmission parameter information indicates a transmission method that allows transmission with relatively high use efficiency, and the second grant-free transmission parameter information indicates a transmission method that allows transmission with relatively low use efficiency. Here, the transmission method with relatively high use efficiency is, for example, MIMO transmission for spatial multiplexing of a plurality of pieces of data, and the transmission method with relatively low use efficiency is, for example, transmit diversity for spatial multiplexing of one piece of data.

As a result of the switch, the first grant-free transmission parameter information allows transmission with high transmission efficiency in the case where there is no interference. The second grant-free transmission parameter information allows transmission with high resistance to interference in the case where there is an interference.

(5) Transmission Method Regarding Non-Orthogonal Domain

The grant-free transmission parameter information may be information related to the transmission method regarding the non-orthogonal domain used for the uplink data of the grant-free transmission. For example, the grant-free transmission parameter information may be information indicating one of user multiplexing systems (multiple access systems) using the non-orthogonal resources. In addition, the grant-free transmission parameter information may be information indicating whether or not there is a user multiplexing system using the non-orthogonal resources. That is, the grant-free transmission parameter information related to the transmission method regarding the non-orthogonal domain may be information indicating the transmission method using the non-orthogonal resources or may be information indicating the transmission method not using the non-orthogonal resources (that is, transmission method using only the orthogonal resources).

For example, the first grant-free transmission parameter information indicates transmission using a non-orthogonal resource pattern with relatively high use efficiency, and the second grant-free transmission parameter information indicates transmission using a non-orthogonal resource pattern with relatively low use efficiency. In addition, for example, the first grant-free transmission parameter information indicates a transmission method not using the non-orthogonal resources (transmission method using only the orthogonal resources), and the second grant-free transmission parameter information indicates a transmission method using the non-orthogonal resources.

As a result of the switch, the first parameter allows transmission with high transmission efficiency in the case where there is no interference. The second parameter allows transmission with high resistance to interference in the case where there is an interference.

(6) Signal Waveform

The grant-free transmission parameter information may be information regarding the signal waveform used for the uplink data of the grant-free transmission. Examples of the signal waveform include the CP-OFDM signal and the DFT-s-OFDM signal as described above.

For example, the first grant-free transmission parameter information indicates a signal waveform with a relatively high PAPR. The second grant-free transmission parameter information indicates a signal waveform with a relatively low PAPR. Here, the signal waveform with a relatively high PAPR is, for example, the CP-OFDM signal, and the signal waveform with a relatively low PAPR is, for example, the DFT-s-OFDM signal.

As a result of the switch, the first grant-free transmission parameter information allows transmission with high transmission efficiency although the PAPR is high in the case where there is no interference. The second grant-free transmission parameter information can reduce the PAPR and allows transmission with high resistance to interference in the case where there is an interference.

(7) Slot Length

The grant-free transmission parameter information may be information regarding the slot length used for the uplink data of the grant-free transmission. The slot length can be prescribed or set by the number of symbols and/or the time length of one symbol (that is, subcarrier spacing) as described above. In addition, the slot length may be prescribed or set by an assembly (aggregation) of one or more URLLC slots.

For example, the first grant-free transmission parameter information indicates a relatively short slot length. The second grant-free transmission parameter information indicates a relatively long slot length.

As a result of the switch, the first grant-free transmission parameter information can reduce the time used for the data transmission and allows transmission with high transmission efficiency in the case where there is no interference. The second grant-free transmission parameter information can increase the resources used for the data transmission and allows transmission with high resistance to interference in the case where there is an interference.

(8) The Number of Repetitions of Data Transmission

The grant-free transmission parameter information may be information regarding the number of repetitions of the transmission for the uplink data of the grant-free transmission. The repetitions of data transmission denote transmission of the same data for a plurality of times using different physical resources. This increases the reliability of data.

For example, the first grant-free transmission parameter information indicates a relatively small number of repetitions, and the second grant-free transmission parameter information indicates a relatively large number of repetitions. In addition, for example, the first grant-free transmission parameter information indicates transmission in which the data transmission is not repeated, and the second transmission parameter indicates transmission in which the data transmission is repeated once or more.

As a result of the switch, the first grant-free transmission parameter information can reduce unnecessary data transmission and allows transmission with high transmission efficiency in the case where there is no interference. The second grant-free transmission parameter information can improve the reliability of data and allows transmission with high resistance to interference in the case where there is an interference.

(9) Beam Pattern

The grant-free transmission parameter information may be information regarding the beam pattern (that is, precoding pattern) used for the uplink data of the grant-free transmission. The beam pattern is a pattern regarding the direction of the beam and the size (sharpness) of the beam.

For example, the first grant-free transmission parameter information indicates a beam direction relative to the base station apparatus 100 with relatively high transmission efficiency. The second grant-free transmission parameter information indicates a beam direction relative to the base station apparatus 100 with a relatively small interference.

As a result of the switch, the first grant-free transmission parameter information allows transmission with high transmission efficiency in the case where there is no interference. The second grant-free transmission parameter information allows transmission with a small interference in the case where there is an interference.

<3.2.2. Grant-Based Transmission Parameter Information>

The grant-based transmission parameter information is used for the uplink data of grant-based transmission. The base station apparatus 100 generates grant-based transmission parameter information and transmits the grant-based transmission parameter information to the eMBB terminal 300. The eMBB terminal 300 generates eMBB data based on the received grant-based transmission parameter information and transmits the eMBB data to the base station apparatus 100.

The grant-based transmission parameter information can include information regarding at least one of the modulation system, the encoding rate, the transmission power, the number of layers (the number of spatially multiplexed signals), the transmission method regarding the spatial domain, the transmission method regarding the non-orthogonal domain, the signal waveform, the slot length, the number of repetitions of data transmission, or the beam pattern as in the grant-free transmission parameter information.

However, the setting value of the grant-based transmission parameter information is not switched according to whether or not there is an interference, unlike in the grant-free transmission parameter information. This is because the base station apparatus 100 cannot recognize whether or not the URLLC terminal 200 that performs the grant-free transmission actually uses the allocated resources to perform the transmission.

Furthermore, the grant-based transmission parameter information includes information regarding the resources (time, frequency, and/or encoding) used for the uplink transmission. It should be noted that the information regarding the resources used for the uplink transmission is statically or quasi-statically set in relation to the grant-free transmission, and the grant-free transmission parameter information does not include the information regarding the resources used for the uplink transmission.

<3.3. Notification Method of Grant-Free Transmission Parameter Information>

The base station apparatus 100 uses a control channel to transmit the grant-free transmission parameter information to the URLLC terminal 200 to notify the grant-free transmission parameter information. There can be various notification methods. For example, the notification methods are classified into an explicit notification method and an implicit notification method.

(1) Explicit Notification Method

The explicit notification method is a method of directly notifying the grant-free transmission parameter information.

The base station apparatus 100 may use a downlink control channel in a physical layer to notify the grant-free transmission parameter information. The control channel used for the notification of the grant-free transmission parameter information is one of the following.

Control Channel Specific to Terminal

A control channel specific to a terminal is a control channel for transmission addressed to an individual URLLC terminal 200. The base station apparatus 100 transmits the control information including the grant-free transmission parameter information to be set by the URLLC terminal 200, through the control channel for transmission addressed to the individual URLLC terminal 200. In a case where the control channel specific to the terminal is used, individual grant-free transmission parameter information for the URLLC terminal 200 can be notified, and the base station apparatus 100 can set details.

Error correction coding is applied to the control channel specific to the terminal, and redundant bits obtained by the error correction coding are scrambled and generated by scramble information (for example, scramble ID) specific to the URLLC terminal 200. Therefore, the URLLC terminal 200 can recognize the control channel including the control information addressed to the URLLC terminal 200.

The scramble information may be individually set for the grant-free transmission. In that case, the URLLC terminal 200 is notified of the scramble information through RRC signaling.

Control Channel Common to a Plurality of Terminals

A control channel common to a plurality of terminals is a control channel for transmission addressed to a plurality of URLLC terminals 200. The base station apparatus 100 transmits the control information including the grant-free transmission parameter information to be set by the plurality of URLLC terminals 200, through the control channel for transmission addressed to the plurality of URLLC terminals 200.

The control information may be information including multiplexed grant-free transmission parameter information for the plurality of URLLC terminals 200. For example, in a case where the grant-free transmission parameter information for one URLLC terminal 200 is 2 bits, the control information of 20 bits may be transmitted through the control channel common to ten URLLC terminals 200. In this case, information (for example, bit position) for specifying the grant-free transmission parameter information corresponding to each URLLC terminal 200 among the plurality of pieces of multiplexed grant-free transmission parameter information may be set in advance for each URLLC terminal 200. The setting is performed through, for example, RRC signaling. Each URLLC terminal 200 acquires the grant-free transmission parameter information addressed to the URLLC terminal 200 based on the setting.

The control information may include grant-free transmission parameter information common to the plurality of URLLC terminals 200. In that case, the overhead for the notification of the grant-free transmission parameter information can be suppressed.

Error correction coding is applied to the control channel common to the plurality of terminals, and redundant bits obtained by the error correction coding are scrambled and generated by scramble information common to the plurality of target URLLC terminals 200. Therefore, each of the plurality of target URLLC terminals 200 can recognize the control channel including the control information addressed to the plurality of URLLC terminals 200 including the URLLC terminal 200.

The scramble information may be individually set for the grant-free transmission. In that case, the URLLC terminal 200 is notified of the scramble information through RRC signaling.

(2) Implicit Notification Method

The implicit notification method is a method of indirectly notifying the grant-free transmission parameter information in association with other information.

For example, the grant-free transmission parameter information is notified in association with slot format information.

The slot format information is information notified for each of one or more slots and is information indicating the format (slot configuration) in the slot of the uplink, the downlink, or the like. The slot format information is information indicating that the slot is for only the uplink transmission, only the downlink transmission, a combination of the downlink transmission and the uplink transmission, a blank, or the like as described above. For example, the slot format information is notified through a frequency carrier using time division duplex (TDD).

For example, in a case where the slot format information is a first format, the URLLC terminal 200 uses the first grant-free transmission parameter information as the grant-free transmission parameter information. On the other hand, in a case where the slot format information is a second format, the URLLC terminal 200 uses the second grant-free transmission parameter information as the grant-free transmission parameter information. Specifically, the first format may be a format that allows the transmission by only the URLLC terminal 200, and the second format may be a format that allows the transmission by both the URLLC terminal 200 and the eMBB terminal 300.

(3) Notification Timing

The base station apparatus 100 notifies the downlink control channel including the grant-free transmission parameter information through a predetermined slot (equivalent to a first slot).

Periodic Notification

The base station apparatus 100 can periodically notify the grant-free transmission parameter information. In that case, the URLLC terminal 200 receives the downlink control channel including the grant-free transmission parameter information at a predetermined period.

The notification period of the grant-free parameter may be determined based on a transmission time interval of the eMBB data. In other words, the slot for transmitting the downlink control channel including the grant-free transmission parameter information may be determined based on the transmission time interval of the eMBB data. For example, the notification period of the grant-free transmission parameter may be the same length as the eMBB slot or the same length as an integral multiple of the eMBB slot. That is, the notification period of the grant-free transmission parameter may be the same length as an integral multiple of seven or fourteen symbols. In this case, the base station apparatus 100 can perform the adaptive control of the grant-free transmission parameter information on the basis of the eMBB slot length.

The notification period of the grant-free transmission parameter information may be a length on the basis of one millisecond equivalent to one subframe length.

The notification period of the grant-free transmission parameter information may be a length on the basis of ten milliseconds equivalent to one wireless frame length.

The notification period of the grant-free transmission parameter information may be prescribed or may be set though RRC signaling.

Non-Periodic Notification

The base station apparatus 100 non-periodically notifies the grant-free transmission parameter information. In this case, the URLLC terminal 200 monitors (that is, blind detection) the downlink control channel that can include the grant-free transmission parameter information.

The slot for transmitting the downlink control channel including the grant-free transmission parameter information may be determined based on the period determined based on the transmission time interval of the eMBB data, that is, the notification period. More specifically, the base station apparatus 100 transmits the downlink control channel including the grant-free transmission parameter information at timing of changing the grant-free transmission parameter information in the notification period. Examples of the timing of changing the grant-free transmission parameter information include timing of a change in the presence or absence of an overlap in resources of the URLLC data and the eMBB data, timing of a change in the content of the eMBB data, and timing of a change in the eMBB terminal 300 of the interfering party. Every time in the notification period, the URLLC terminal 200 monitors (that is, receives) the slot (that is, first slot) in which the downlink control channel including the grant-free transmission parameter information may be transmitted. In a case where the URLLC terminal 200 detects the grant-free transmission parameter information as a result of the monitoring, the URLLC terminal 200 uses the detected grant-free transmission parameter information to perform the grant-free transmission from then on. On the other hand, in a case where the URLLC terminal 200 does not detect the grant-free transmission parameter information as a result of the monitoring, the URLLC terminal 200 uses predetermined grant-free transmission parameter information to perform the grant-free transmission. Specifically, the URLLC terminal 200 continuously uses the latest grant-free transmission parameter information and uses prescribed grant-free transmission parameter information or grant-free transmission parameter information set specifically for the base station apparatus 100 or specifically for the URLLC terminal 200 to perform the grant-free transmission. Note that the grant-free transmission parameter information specific to the base station apparatus 100 or specific to the URLLC terminal 200 can be set through RRC signaling.

(4) Notification Method of Grant-Based Transmission Parameter Information

The notification method of the grant-based transmission parameter information is similar to the notification method of the grant-free transmission parameter information.

<3.4. Application Period of Grant-Free Transmission Parameter Information>

When the URLLC terminal 200 receives the grant-free transmission parameter information regarding the grant-free transmission, the URLLC terminal 200 applies the received grant-free transmission parameter information to perform the transmission.

The correspondence between the URLLC slot (equivalent to first slot) that has received the grant-free transmission parameter information and the URLLC slots in which the transmission based on the grant-free transmission parameter information is applied is prescribed or set through RRC signaling. The URLLC slots in which the transmission based on the received grant-free transmission parameter information is applied are URLLC slots in a period including a predetermined number of continuous URLLC slots. The period will also be referred to as an application period of the grant-free transmission parameter information.

The application period of the grant-free transmission parameter information may be determined based on the transmission time interval of the eMBB data. For example, the application period of the grant-free transmission parameter information may be the same length as the eMBB slot or may be the same length as an integral multiple of the eMBB slot. That is, the application period of the grant-free transmission parameter information may be the same length as an integral multiple of seven or fourteen symbols. In this case, the base station apparatus 100 can perform the adaptive control of the grant-free transmission parameter information on the basis of the eMBB slot length.

The application period of the grant-free transmission parameter information may be a length on the basis of one millisecond equivalent to one subframe length.

The application period of the grant-free transmission parameter information may be a length on the basis of ten milliseconds equivalent to one wireless frame length.

A leading slot (equivalent to a second slot) in the application period of the grant-free transmission parameter information may be prescribed or may be set through RRC signaling.

Here, the relationship (that is, time difference) between the slot that has received the grant-free transmission parameter information and the leading slot in the application period of the grant-free transmission parameter information may be set specifically for the URLLC terminal 200. This is because the processing time from the reception of the control channel by the URLLC terminal 200 to the time that the transmission using the grant-free transmission parameter information after detecting the grant-free transmission parameter information becomes possible varies according to the ability of the URLLC terminal 200. Therefore, the relationship between the URLLC slot that has received the grant-free transmission parameter information and the leading slot in the application period of the grant-free transmission parameter information may be set according to terminal ability information of the URLLC terminal 200. In this way, even in a case where the processing time varies between a plurality of URLLC terminals 200, each URLLC terminal 200 can quickly apply the grant-free transmission parameter information while maintaining the processing time. The terminal ability information is, for example, information indicating calculation ability, storage ability, remaining battery, and the like, and the terminal ability information is also called capability information.

The URLLC terminal 200 transmits, to the base station apparatus 100, the terminal ability information regarding the time difference between the slot that has received the grant-free transmission parameter information and the leading slot in the application period of the grant-free transmission parameter information. In this way, the base station apparatus 100 can set, specifically for the URLLC terminal 200, the time difference between the slot that has received the grant-free transmission parameter information and the leading slot of the application period of the grant-free transmission parameter information.

The application period of the grant-free transmission parameter information can be assumed as the notification period of the grant-free transmission parameter information. That is, the URLLC terminal 200 receives the grant-free transmission parameter information notified in a predetermined slot or symbol in the application period of the grant-free transmission parameter information. More specifically, the URLLC terminal 200 monitors the downlink control channel including the grant-free transmission parameter information mapped on the predetermined slot or symbol in the application period of the rant-free transmission parameter information.

<3.5. Modification>

In the description above, although the grant-free transmission parameter information is switched on the assumption that one grant-free transmission available resource is provided at predetermined unit time, the present technique is not limited to the example. For example, the grant-free transmission parameter information may include information indicating physical resources (such as time resources, frequency resources, and/or encoding resources) used for the uplink data of the grant-free transmission. The physical resources may be the grant-free transmission available resources or may be resources to be used among the allocated grant-free transmission available resources. For example, two or more grant-free transmission available resources can be provided (set) to the URLLC terminal 200 at predetermined unit time, and the URLLC terminal 200 can notify one grant-free transmission available resource to be used among the grant-free transmission available resources in which the grant-free transmission parameter information is set.

For example, the first grant-free transmission parameter information indicates a first resource. The second grant-free transmission parameter information indicates a second resource.

Here, the first grant-free transmission parameter information and the second grant-free transmission parameter information may not depend on whether or not there is an interference caused by the eMBB data. That is, the first grant-free transmission parameter information and the second grant-free transmission parameter information may be used to notify physical resources without an interference (or with a low interference) caused by the eMBB data. In this case, the URLLC terminal 200 can use resources without an interference or with a low interference caused by the eMBB data to transmit the URLLC data.

4. Application Examples

Hereinafter, application examples of the technique according to the present disclosure will be described. Note that in the present specification, an eNB (evolved Node B) is also called a gNB.

The technique according to the present disclosure can be applied to various products. For example, the base station apparatus 100 may be realized as one of the types of eNB (evolved Node B), such as a macro eNB and a small eNB. The small eNB may be an eNB, such as a pico eNB, a micro eNB, and a home (femto) eNB, that covers a cell smaller than the macro cell. Instead of this, the base station apparatus 100 may be realized as another type of base station, such as a NodeB and a BTS (Base Transceiver Station). The base station apparatus 100 may include a main body (also referred to as base station apparatus) that controls wireless communication and one or more RRHs (Remote Radio Heads) arranged at places different from the main body. In addition, various types of terminals described later may temporarily or almost permanently execute base station functions to operate as the base station apparatus 100.

In addition, for example, the terminal apparatuses 200 and 300 may be realized as mobile terminals, such as a smartphone, a tablet PC (Personal Computer), a notebook PC, a portable game terminal, a portable/dongle mobile router, and a digital camera, or may be realized as in-vehicle terminals, such as a car navigation apparatus. In addition, the terminal apparatuses 200 and 300 may be realized as terminals (also referred to as MTC (Machine Type Communication) terminals) that perform M2M (Machine to Machine) communication. Furthermore, the terminal apparatuses 200 and 300 may be wireless communication modules mounted on these terminals (for example, integrated circuit module including one die).

4.1. Application Example Regarding Base Station Apparatus

First Application Example

Figure 12:
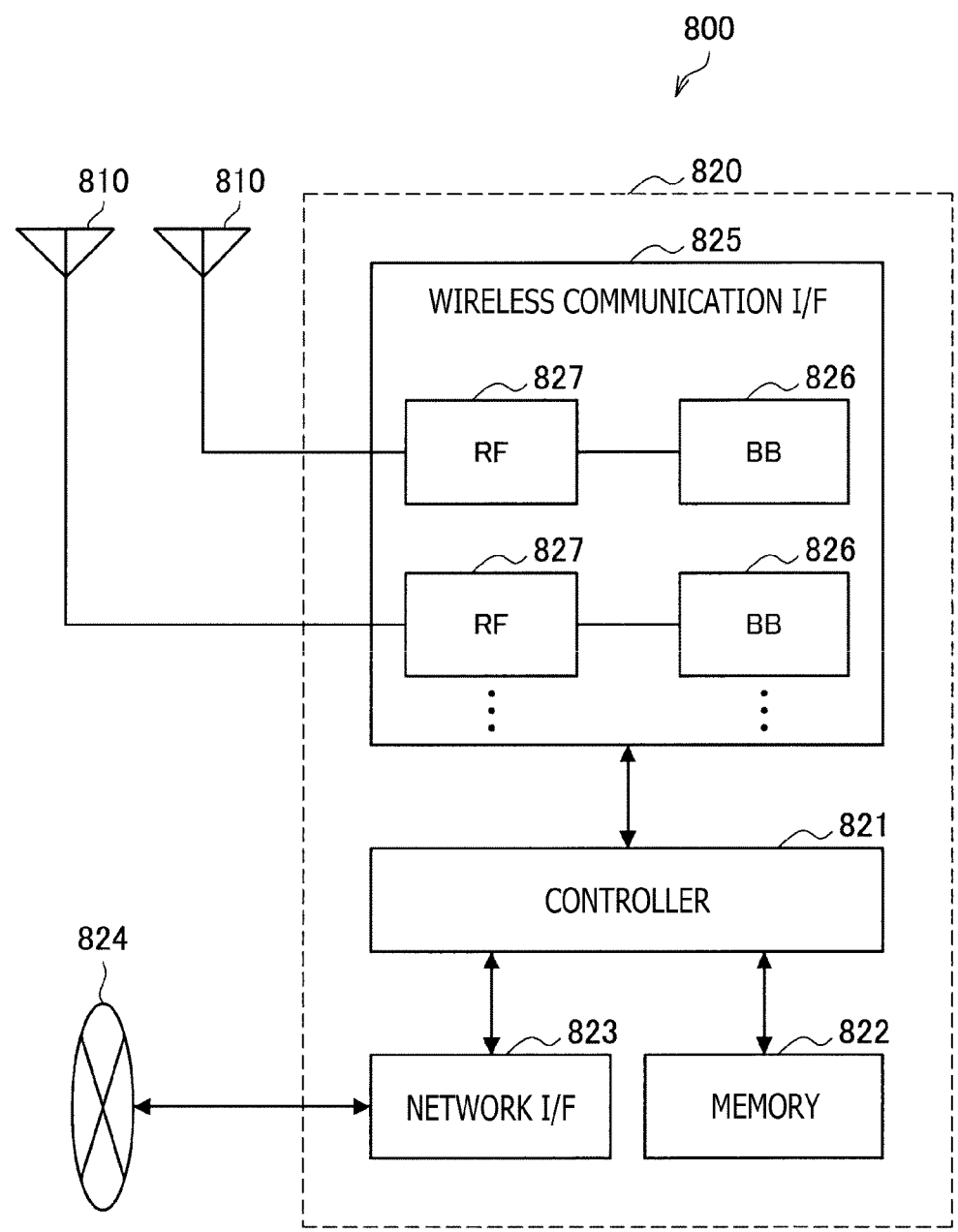
FIG. 12 is a block diagram illustrating a first example of a schematic configuration of an eNB.

FIG. 12 is a block diagram illustrating a first example of a schematic configuration of the eNB in which the technique according to the present disclosure can be applied. An eNB 800 includes one or more antennas 810 and a base station apparatus 820. Each of the antennas 810 and the base station apparatus 820 can be connected to each other through an RF cable.

Each of the antennas 810 includes a single or a plurality of antenna elements (for example, a plurality of antenna elements included in a MIMO antenna), and the antenna 810 is used for wireless signals transmitted and received by the base station apparatus 820. The eNB 800 includes a plurality of antennas 810 as illustrated in FIG. 12, and the plurality of antennas 810 may correspond to, for example, a plurality of frequency bands used by the eNB 800. Note that although the eNB 800 includes a plurality of antennas 810 in the example illustrated in FIG. 12, the eNB 800 may include a single antenna 810.

The base station apparatus 820 includes a controller 821, a memory 822, a network interface 823, and a wireless communication interface 825.

The controller 821 may be, for example, a CPU or a DSP, and the controller 821 operates various functions of upper layers of the base station apparatus 820. For example, the controller 821 generates data packets from data in a signal processed by the wireless communication interface 825 and transfers the generated packets through the network interface 823. The controller 821 may bundle data from a plurality of baseband processors to generate bundled packets and transfer the generated bundled packets. In addition, the controller 821 may have logical functions for executing control, such as radio resource control, radio bearer control, mobility management, admission control, and scheduling. In addition, the control may be executed in cooperation with a surrounding eNB or core network. The memory 822 includes a RAM and a ROM and stores a program executed by the controller 821 and various types of control data (for example, a terminal list, transmission power data, scheduling data, and the like).

The network interface 823 is a communication interface for connecting the base station apparatus 820 to a core network 824. The controller 821 may communicate with a core network node or another eNB through the network interface 823. In that case, the eNB 800 and the core network node or the other eNB may be connected to each other through a logical interface (for example, S1 interface or X2 interface). The network interface 823 may be a wired communication interface or a wireless communication interface for wireless backhaul. In the case where the network interface 823 is a wireless communication interface, the network interface 823 may use a frequency band higher than the frequency band used by the wireless communication interface 825 in the wireless communication.

The wireless communication interface 825 supports a cellular communication system, such as LTE (Long Term Evolution) or LTE-Advanced, and provides wireless connection to terminals positioned in the cell of the eNB 800 through the antenna 810. The wireless communication interface 825 can typically include baseband (BB) processors 826, RF circuits 827, and the like. The BB processor 826 may execute, for example, encoding/decoding, modulation/demodulation, multiplexing/demultiplexing, and the like, and the BB processor 826 executes various types of signal processing of each layer (for example, L1, MAC (Medium Access Control), RLC (Radio Link Control), and PDCP (Packet Data Convergence Protocol)). The BB processor 826 may include part or all of the logical functions in place of the controller 821. The BB processor 826 may be a module including a memory that stores a communication control program, a processor that executes the program, and a related circuit, and the functions of the BB processor 826 may be changed by updating the program. In addition, the module may be a card or a blade inserted into a slot of the base station apparatus 820 or may be a chip mounted on the card or the blade. On the other hand, the RF circuit 827 may include a mixer, a filter, an amplifier, and the like, and the RF circuit 827 transmits and receives wireless signals through the antenna 810.

The wireless communication interface 825 includes a plurality of BB processors 826 as illustrated in FIG. 12, and the plurality of BB processors 826 may correspond to, for example, a plurality of frequency bands used by the eNB 800. In addition, the wireless communication interface 825 includes a plurality of RF circuits 827 as illustrated in FIG. 12, and the plurality of RF circuits 827 may correspond to, for example, a plurality of antenna elements. Note that although the wireless communication interface 825 includes a plurality of BB processors 826 and a plurality of RF circuits 827 in the example illustrated in FIG. 12, the wireless communication interface 825 may include a single BB processor 826 or a single RF circuit 827.

In the eNB 800 illustrated in FIG. 12, one or more constituent elements (setting unit 151 and/or communication processing unit 153) included in the base station apparatus 100 described with reference to FIG. 6 may be implemented in the wireless communication interface 825. Alternatively, at least part of the constituent elements may be implemented in the controller 821. For example, a module including part (for example, BB processor 826) or all of the wireless communication interface 825 and/or the controller 821 may be mounted on the eNB 800, and one or more of the constituent elements may be implemented in the module. In this case, the module may store a program for causing the processor to function as one or more of the constituent elements (in other words, a program for causing the processor to execute the operations of one or more of the constituent elements) and execute the program. In another example, the program for causing the processor to function as one or more of the constituent elements described above may be installed on the eNB 800, and the wireless communication interface 825 (for example, BB processor 826) and/or the controller 821 may execute the program. In this way, the eNB 800, the base station apparatus 820, or the module may be provided as an apparatus including one or more of the constituent elements, and the program for causing the processor to function as one or more of the constituent elements may be provided. In addition, a readable recording medium recording the program may also be provided.

In addition, in the eNB 800 illustrated in FIG. 12, the wireless communication unit 120 described with reference to FIG. 6 may be implemented in the wireless communication interface 825 (for example, RF circuit 827). In addition, the antenna unit 110 may be implemented in the antenna 810. In addition, the network communication unit 130 may be implemented in the controller 821 and/or the network interface 823. In addition, the storage unit 140 may be implemented in the memory 822.

Second Application Example

Figure 13:
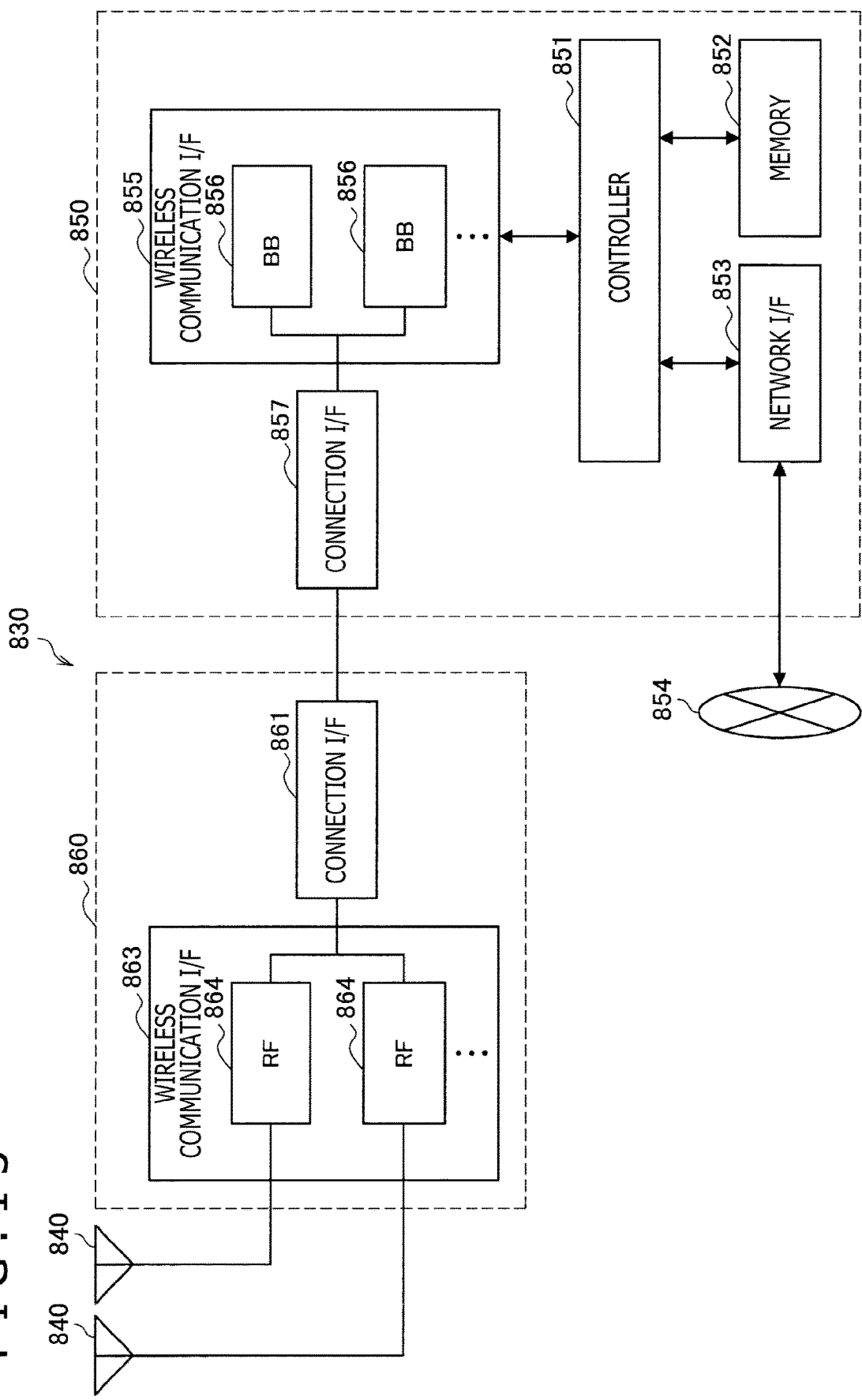
FIG. 13 is a block diagram illustrating a second example of the schematic configuration of the eNB.

FIG. 13 is a block diagram illustrating a second example of a schematic configuration of the eNB in which the technique according to the present disclosure can be applied. An eNB 830 includes one or more antennas 840, a base station apparatus 850, and an RRH 860. Each of the antennas 840 and the RRH 860 can be connected to each other through an RF cable. In addition, the base station apparatus 850 and the RRH 860 can be connected to each other through a high-speed line such as an optical fiber cable.

Each of the antennas 840 includes a single or a plurality of antenna elements (for example, a plurality of antenna elements included in a MIMO antenna), and the antenna 840 is used for wireless signals transmitted and received by the RRH 860. The eNB 830 includes a plurality of antennas 840 as illustrated in FIG. 13, and the plurality of antennas 840 may correspond to, for example, a plurality of frequency bands used by the eNB 830. Note that although the eNB 830 includes a plurality of antennas 840 in the example illustrated in FIG. 13, the eNB 830 may include a single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 12.

The wireless communication interface 855 supports a cellular communication system, such as LTE and LTE-Advanced, and provides wireless connection to the terminals positioned in the sector corresponding to the RRH 860 through the RRH 860 and the antenna 840. The wireless communication interface 855 can typically include BB processors 856 and the like. The BB processor 856 is similar to the BB processor 826 described with reference to FIG. 12, except that the BB processor 856 is connected to an RF circuit 864 of the RRH 860 through the connection interface 857. The wireless communication interface 855 includes a plurality of BB processors 856 as illustrated in FIG. 13, and the plurality of BB processors 856 may correspond to, for example, a plurality of frequency bands used by the eNB 830. Note that although the wireless communication interface 855 includes a plurality of BB processors 856 in the example illustrated in FIG. 13, the wireless communication interface 855 may include a single BB processor 856.

The connection interface 857 is an interface for connecting the base station apparatus 850 (wireless communication interface 855) to the RRH 860. The connection interface 857 may be a communication module for communication through the high-speed line that connects the base station apparatus 850 (wireless communication interface 855) and the RRH 860.

In addition, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication through the high-speed line.

The wireless communication interface 863 transmits and receives wireless signals through the antenna 840. The wireless communication interface 863 may typically include the RF circuit 864 and the like. The RF circuit 864 may include a mixer, a filter, an amplifier, and the like, and the RF circuit 864 transmits and receives wireless signals through the antenna 840. The wireless communication interface 863 includes a plurality of RF circuits 864 as illustrated in FIG. 13, and the plurality of RF circuits 864 may correspond to, for example, a plurality of antenna elements. Note that although the wireless communication interface 863 includes a plurality of RF circuits 864 in the example illustrated in FIG. 13, the wireless communication interface 863 may include a single RF circuit 864.

In the eNB 830 illustrated in FIG. 13, one or more constituent elements (setting unit 151 and/or communication processing unit 153) included in the base station apparatus 100 described with reference to FIG. 6 may be implemented in the wireless communication interface 855 and/or the wireless communication interface 863. Alternatively, at least part of the constituent elements may be implemented in the controller 851. For example, a module including part (for example, BB processor 856) or all of the wireless communication interface 855 and/or the controller 851 may be mounted on the eNB 830, and one or more of the constituent elements may be implemented in the module. In this case, the module may store a program for causing the processor to function as one or more of the constituent elements (in other words, a program for causing the processor to execute operations of one or more of the constituent elements) and execute the program. In another example, a program for causing the processor to function as one or more of the constituent elements may be installed on the eNB 830, and the wireless communication interface 855 (for example, BB processor 856) and/or the controller 851 may execute the program. In this way, the eNB 830, the base station apparatus 850, or the module may be provided as an apparatus including one or more of the constituent elements, and the program for causing the processor to function as one or more of the constituent elements may be provided. In addition, a readable recording medium recording the program may also be provided.

Furthermore, in the eNB 830 illustrated in FIG. 13, the wireless communication unit 120 described with reference to FIG. 6 may be implemented in, for example, the wireless communication interface 863 (for example, RF circuit 864). In addition, the antenna unit 110 may be implemented in the antenna 840. In addition, the network communication unit 130 may be implemented in the controller 851 and/or the network interface 853. In addition, the storage unit 140 may be implemented in the memory 852.

4.2. Application Example Regarding Terminal Apparatus

First Application Example

Figure 14:
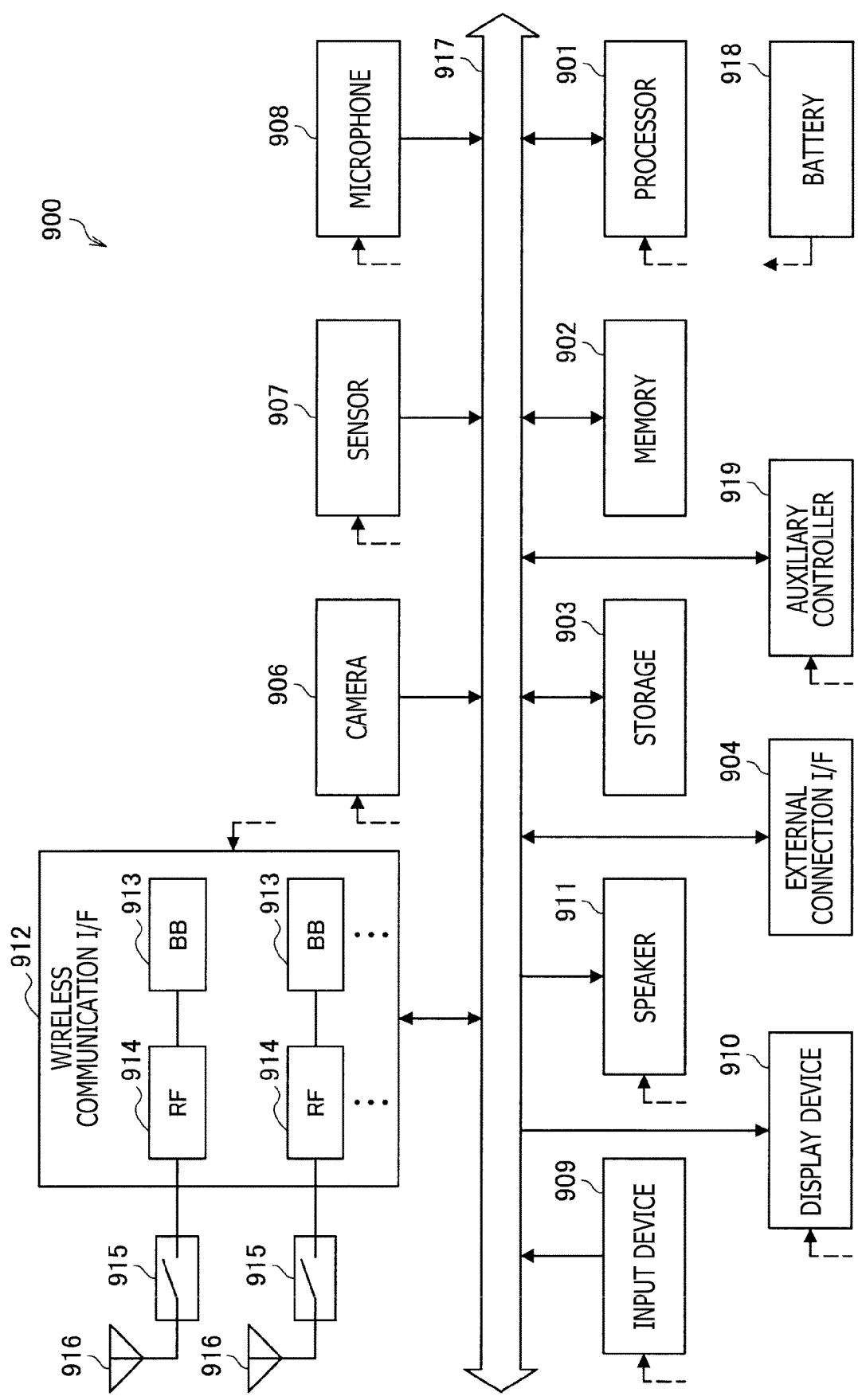
FIG. 14 is a block diagram illustrating an example of a schematic configuration of a smartphone.

FIG. 14 is a block diagram illustrating an example of a schematic configuration of a smartphone 900 in which the technique according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or an SoC (System on Chip), and the processor 901 controls functions of an application layer of the smartphone 900 and other layers. The memory 902 includes a RAM and a ROM and stores a program executed by the processor 901 and data. The storage 903 can include a storage medium such as a semiconductor memory and a hard disk. The external connection interface 904 is an interface for connecting an external device, such as a memory card and a USB (Universal Serial Bus) device, to the smartphone 900.

The camera 906 includes, for example, an imaging element, such as a CCD (Charge Coupled Device) and a CMOS (Complementary Metal Oxide Semiconductor), and generates a captured image. The sensor 907 can include, for example, a sensor group, such as a positioning sensor, a gyrosensor, a geomagnetic sensor, and an acceleration sensor. The microphone 908 converts sound input to the smartphone 900 into a sound signal. The input device 909 includes, for example, a touch sensor, a keypad, a keyboard, a button, a switch, or the like for detecting a touch of a screen of the display device 910 and receives input of operation or information from the user. The display device 910 includes a screen, such as a liquid crystal display (LCD) and an organic light emitting diode (OLED) display, and displays an output image of the smartphone 900. The speaker 911 converts a sound signal output from the smartphone 900 into sound.

The wireless communication interface 912 supports a cellular communication system, such as LTE and LTE-Advanced, and executes wireless communication. The wireless communication interface 912 can typically include BB processors 913, RF circuits 914, and the like. The BB processor 913 may perform, for example, encoding/decoding, modulation/demodulation, multiplexing/demultiplexing, and the like, and the BB processor 913 executes various types of signal processing for wireless communication. On the other hand, the RF circuit 914 may include a mixer, a filter, an amplifier, and the like, and the RF circuit 914 transmits and receives a wireless signal through the antenna 916. The wireless communication interface 912 may be a one-chip module in which the BB processors 913 and the RF circuits 914 are integrated. The wireless communication interface 912 may include a plurality of BB processors 913 and a plurality of RF circuits 914 as illustrated in FIG. 14. Note that although the wireless communication interface 912 includes a plurality of BB processors 913 and a plurality of RF circuits 914 in the example illustrated in FIG. 14, the wireless communication interface 912 may include a single BB processor 913 or a single RF circuit 914.

Furthermore, the wireless communication interface 912 may also support other types of wireless communication systems, such as a short-range wireless communication system, a near-field wireless communication system, and a wireless LAN (Local Area Network) system, in addition to the cellular communication system, and in that case, the wireless communication interface 912 may include the BB processor 913 and the RF circuit 914 for each wireless communication system.

Each of the antenna switches 915 switches the destinations of the antenna 916 between a plurality of circuits (for example, circuits for different wireless communication systems) included in the wireless communication interface 912.

Each of the antennas 916 includes a single or a plurality of antenna elements (for example, a plurality of antenna elements included in a MIMO antenna) and is used for wireless signals transmitted and received by the wireless communication interface 912. The smartphone 900 may include a plurality of antennas 916 as illustrated in FIG. 14. Note that although the smartphone 900 includes a plurality of antennas 916 in the example illustrated in FIG. 14, the smartphone 900 may include a single antenna 916.

Furthermore, the smartphone 900 may include the antenna 916 for each wireless communication system. In that case, the antenna switch 915 may be removed from the configuration of the smartphone 900.

The bus 917 mutually connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919. The battery 918 supplies power to each block of the smartphone 900 illustrated in FIG. 14 through power lines partially indicated by dotted lines in FIG. 14. The auxiliary controller 919 causes the smartphone 900 to operate minimum required functions in, for example, a sleep mode.

In the smartphone 900 illustrated in FIG. 14, one or more constituent elements (setting unit 241 and/or communication processing unit 243) included in the URLLC terminal 200 described with reference to FIG. 7 may be implemented in the wireless communication interface 912. Alternatively, at least part of the constituent elements may be implemented in the processor 901 or the auxiliary controller 919. For example, a module including part (for example, BB processor 913) or all of the wireless communication interface 912, the processor 901, and/or the auxiliary controller 919 may be mounted on the smartphone 900, and one or more of the constituent elements may be implemented in the module. In this case, the module may store a program for causing the processor to function as one or more of the constituent elements (in other words, a program for causing the processor to execute the operations of one or more of the constituent elements) and execute the program. In another example, a program for causing the processor to function as one or more of the constituent elements may be installed on the smartphone 900, and the wireless communication interface 912 (for example, BB processor 913), the processor 901, and/or the auxiliary controller 919 may execute the program. In this way, the smartphone 900 or the module may be provided as an apparatus including one or more of the constituent elements, and the program for causing the processor as one or more of the constituent elements may be provided. In addition, a readable recording medium recording the program may also be provided.

Furthermore, in the smartphone 900 illustrated in FIG. 14, the wireless communication unit 220 described with reference to FIG. 7 may be implemented in, for example, the wireless communication interface 912 (for example, RF circuit 914). In addition, the antenna unit 210 may be implemented in the antenna 916. In addition, the memory 902 may be implemented in the storage unit 230.

Second Application Example

Figure 15:
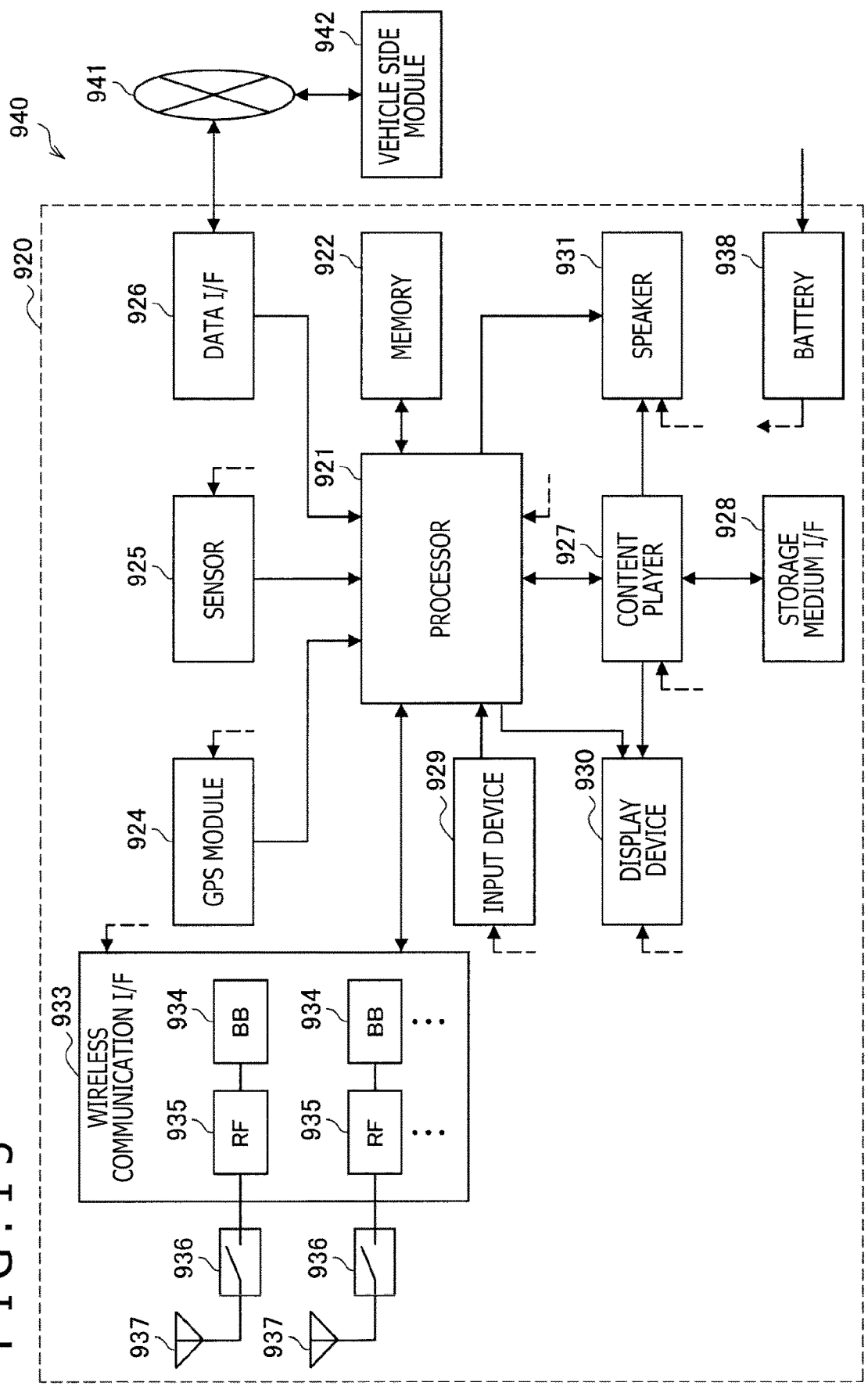
FIG. 15 is a block diagram illustrating an example of a schematic configuration of a car navigation apparatus.

FIG. 15 is a block diagram illustrating an example of a schematic configuration of a car navigation apparatus 920 in which the technique according to the present disclosure can be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and the processor 921 controls navigation functions of the car navigation apparatus 920 and other functions. The memory 922 includes a RAM and a ROM and stores a program executed by the processor 921 and data.

The GPS module 924 uses a GPS signal received from a GPS satellite to measure the position (for example, latitude, longitude, and altitude) of the car navigation apparatus 920. The sensor 925 can include, for example, a sensor group, such as a gyrosensor, a geomagnetic sensor, and a pressure sensor. The data interface 926 is connected to, for example, an in-vehicle network 941 through a terminal not illustrated, and the data interface 926 acquires data, such as speed data, generated on the vehicle side.

The content player 927 reproduces content stored in a storage medium (for example, CD or DVD) inserted into the storage medium interface 928. The input device 929 includes, for example, a touch sensor that detects a touch on the screen of the display device 930, a button, a switch, or the like, and receives input of operation or information from the user. The display device 930 includes a screen, such as an LCD or OLED display, and displays images of navigation functions or content to be reproduced. The speaker 931 outputs sound of navigation functions or content to be reproduced.

The wireless communication interface 933 supports a cellular communication system, such as LTE and LTE-Advanced, and executes wireless communication. The wireless communication interface 933 can typically include BB processors 934, RF circuits 935, and the like. The BB processor 934 may perform, for example, encoding/decoding, modulation/demodulation, multiplexing/demultiplexing, and the like, and the BB processor 934 executes various types of signal processing for wireless communication. On the other hand, the RF circuit 935 may include a mixer, a filter, an amplifier, and the like, and the RF circuit 935 transmits and receives wireless signals through the antenna 937. The wireless communication interface 933 may be a one-chip module in which the BB processors 934 and the RF circuits 935 are integrated. The wireless communication interface 933 may include a plurality of BB processors 934 and a plurality of RF circuits 935 as illustrated in FIG. 15. Note that although the wireless communication interface 933 includes a plurality of BB processors 934 and a plurality of RF circuits 935 in the example illustrated in FIG. 15, the wireless communication interface 933 may include a single BB processor 934 or a single RF circuit 935.

Furthermore, the wireless communication interface 933 may also support other types of wireless communication systems, such as a short-range wireless communication system, a near-field wireless communication system, and a wireless LAN system, in addition to the cellular communication system, and in that case, the wireless communication interface 933 may include the BB processor 934 and the RF circuit 935 for each wireless communication system.

Each of the antenna switches 936 switches the destinations of the antenna 937 between a plurality of circuits (for example, circuits for different wireless communication systems) included in the wireless communication interface 933.

Each of the antennas 937 includes a single or a plurality of antenna elements (for example, a plurality of antenna elements included in a MIMO antenna), and the antenna 937 is used for wireless signals transmitted and received by the wireless communication interface 933. The car navigation apparatus 920 may include a plurality of antennas 937 as illustrated in FIG. 15. Note that although the car navigation apparatus 920 includes a plurality of antennas 937 in the example illustrated in FIG. 15, the car navigation apparatus 920 may include a single antenna 937.

Furthermore, the car navigation apparatus 920 may include the antenna 937 for each wireless communication system. In that case, the antenna switch 936 may be removed from the configuration of the car navigation apparatus 920.

The battery 938 supplies power to each block of the car navigation apparatus 920 illustrated in FIG. 15 through power lines partially indicated by dotted lines in FIG. 15. In addition, the battery 938 stores power supplied from the vehicle side.

In the car navigation apparatus 920 illustrated in FIG. 15, one or more constituent elements (setting unit 241 and/or communication processing unit 243) included in the URLLC terminal 200 described with reference to FIG. 7 may be implemented in the wireless communication interface 933. Alternatively, at least part of the constituent elements may be implemented in the processor 921. For example, a module including part (for example, BB processor 934) or all of the wireless communication interface 933 and/or the processor 921 may be mounted on the car navigation apparatus 920, and one or more of the constituent elements may be implemented in the module. In this case, the module may store a program for causing the processor to function as one or more of the constituent elements (in other words, a program for causing the processor to execute operations of one or more of the constituent elements) and execute the program. In another example, the program for causing the processor to function as one or more of the constituent elements may be installed on the car navigation apparatus 920, and the wireless communication interface 933 (for example, BB processor 934) and/or the processor 921 may execute the program. In this way, the car navigation apparatus 920 or the module may be provided as an apparatus including one or more of the constituent elements, and the program for causing the processor to function as one or more of the constituent elements may be provided. In addition, a readable recording medium recording the program may also be provided.

Furthermore, in the car navigation apparatus 920 illustrated in FIG. 15, the wireless communication unit 220 described with reference to FIG. 7 may be implemented in, for example, the wireless communication interface 933 (for example, RF circuit 935). In addition, the antenna unit 210 may be implemented in the antenna 937. In addition, the storage unit 230 may be implemented in the memory 922.

In addition, the technique according to the present disclosure may be realized as an in-vehicle system (or vehicle) 940 including one or more of the blocks of the car navigation apparatus 920, the in-vehicle network 941, and a vehicle side module 942. The vehicle side module 942 generates vehicle side data, such as vehicle speed, engine speed, and malfunction information, and outputs the generated data to the in-vehicle network 941.

5. Conclusion

An embodiment of the present disclosure has been described in detail with reference to FIGS. 1 to 15. As described above, the URLLC terminal 200 according to the present embodiment is a terminal apparatus that communicates with the base station apparatus 100 that receives the URLLC data of grant-free transmission and the eMBB data of grant-based transmission. The URLLC terminal 200 receives static or quasi-static setting regarding the grant-free transmission available resources from the base station apparatus 100. On the other hand, the URLLC terminal 200 receives, in the predetermined first slot, the downlink control channel including the grant-free transmission parameter information. Furthermore, the URLLC terminal 200 generates the URLLC data based on the grant-free transmission parameter information and uses the uplink resources selected from the grant-free transmission available resources to transmit the URLLC data. In this way, the URLLC terminal 200 uses the dynamically controlled grant-free transmission parameter information to perform the transmission in the statically or quasi-statically set grant-free transmission available resources. Therefore, the URLLC terminal 200 can appropriately update the parameter information for the grant-free transmission to optical parameter information according to whether or not there is an interference dynamically generated between the URLLC data and the eMBB data. As a result, the transmission efficiency of the entire system can be improved.

Although the preferred embodiment of the present disclosure has been described in detail with reference to the attached drawings, the technical scope of the present disclosure is not limited to the example. It is apparent that a person with normal knowledge in the technical field of the present disclosure can conceive various changes or modifications within the technical idea described in the claims, and it is understood that they obviously belong to the technical scope of the present disclosure.

For example, although the dynamic resource sharing of the URLLC data and the eMBB data has been described above, the present technique is not limited to the example. For example, the present technique can be applied to two types or three or more types of dynamic resource sharing including other data such as mMTC data.

In addition, the processes described by using the flow charts and the sequence diagrams in the present specification may not be executed in the illustrated orders. Some processing steps may be executed in parallel. In addition, additional processing steps may be adopted, and part of the processing steps may be removed.

In addition, the advantageous effects described in the present specification are explanatory or exemplary only and not limiting. That is, in addition to or in place of the advantageous effects, the technique according to the present disclosure can attain other advantageous effects apparent to those skilled in the art from the description of the present specification.

Note that the following configuration also belongs to the technical scope of the present disclosure.

(1)

A communication apparatus that communicates with a base station apparatus that receives first uplink data of grant-free transmission and second uplink data of grant-based transmission, the communication apparatus including:

a setting unit that performs setting regarding grant-free transmission available resources based on setting information received from the base station apparatus; and a communication processing unit that receives, in a predetermined first slot, a downlink control channel including parameter information for grant-free transmission and that uses uplink resources selected from the grant-free transmission available resources to transmit the first uplink data generated based on the parameter information.

(2)

The communication apparatus according to (1), in which
the first slot is determined based on a transmission time interval of the second uplink data longer than the first uplink data.

(3)

The communication apparatus according to (1) or (2), in which
the communication processing unit monitors the downlink control channel in the first slot.

(4)

The communication apparatus according to any one of (1) to (3), in which
in a case where the parameter information is not detected in the first slot, the first uplink data is generated based on predetermined parameter information.

(5)

The communication apparatus according to any one of (1) to (4), in which
an application period of the parameter information is determined based on the transmission time interval of the second uplink data longer than the first uplink data.

(6)

The communication apparatus according to (5), in which
a relationship between the first slot and a second slot that is a leading slot of the application period of the parameter information is set specifically for the communication apparatus.

(7)

The communication apparatus according to (6), in which
the communication processing unit transmits terminal ability information regarding a time difference between the first slot and the second slot to the base station apparatus.

(8)

The communication apparatus according to any one of (1) to (7), in which
the parameter information is determined based on whether or not there is the second uplink data.

(9)
The communication apparatus according to (8), in which the second uplink data is transmitted by using orthogonal resources that are at least partially a same as the grant-free transmission available resources.

(10)
The communication apparatus according to any one of (1) to (9), in which the parameter information includes information regarding a modulation system and/or an encoding rate.

(11)
The communication apparatus according to any one of (1) to (10), in which the parameter information includes information regarding transmission power.

(12)
The communication apparatus according to any one of (1) to (11), in which the parameter information includes information regarding a transmission method related to a non-orthogonal domain.

(13)
The communication apparatus according to any one of (1) to (12), in which the parameter information includes information regarding the number of repetitions of data transmission.

(14)
The communication apparatus according to any one of (1) to (13), in which the parameter information includes information regarding a signal waveform.

(15)
The communication apparatus according to any one of (1) to (14), in which the downlink control channel is generated based on scramble information included in the setting information.

(16)
A base station apparatus that communicates with a first communication apparatus for grant-free transmission of first uplink data and a second communication apparatus for grant-based transmission of second uplink data, the base station apparatus including:
a setting unit that transmits setting information regarding grant-free transmission available resources to the first communication apparatus; and
a communication processing unit that transmits, in a predetermined first slot, a downlink control channel including parameter information for grant-free transmission and that receives the first uplink data generated based on the parameter information, the first uplink data transmitted from the first communication apparatus using uplink resources selected from the grant-free transmission available resources.

(17)
A method executed by a communication apparatus that communicates with a base station apparatus that receives first uplink data of grant-free transmission and second uplink data of grant-based transmission, the method including:
performing setting regarding grant-free transmission available resources based on setting information received from the base station apparatus; and
receiving, in a predetermined first slot, a downlink control channel including parameter information for grant-free transmission and using uplink resources selected from the grant-free transmission available resources to transmit the first uplink data generated based on the parameter information.

(18)
A method executed by a base station apparatus that communicates with a first communication apparatus for grant-free transmission of first uplink data and a second communication apparatus for grant-based transmission of second uplink data, the method including:
transmitting setting information regarding grant-free transmission available resources to the first communication apparatus; and transmitting, in a predetermined first slot, a downlink control channel including parameter information for grant-free transmission and receiving the first uplink data generated based on the parameter information, the first uplink data transmitted from the first communication apparatus using uplink resources selected from the grant-free transmission available resources.

(19)
A recording medium recording a program for causing a computer to function as:
a communication apparatus that communicates with a base station apparatus that receives first uplink data of grant-free transmission and second uplink data of grant-based transmission, the communication apparatus including
a setting unit that performs setting regarding grant-free transmission available resources based on setting information received from the base station apparatus, and
a communication processing unit that receives, in a predetermined first slot, a downlink control channel including parameter information for grant-free transmission and that uses uplink resources selected from the grant-free transmission available resources to transmit the first uplink data generated based on the parameter information.

(20)
A recording medium recording a program for causing a computer to function as:
a base station apparatus that communicates with a first communication apparatus for grant-free transmission of first uplink data and a second communication apparatus for grant-based transmission of second uplink data, the base station apparatus including
a setting unit that transmits setting information regarding grant-free transmission available resources to the first communication apparatus, and
a communication processing unit that transmits, in a predetermined first slot, a downlink control channel including parameter information for grant-free transmission and that receives the first uplink data generated based on the parameter information, the first uplink data transmitted from the first communication apparatus using uplink resources selected from the grant-free transmission available resources.

REFERENCE SIGNS LIST

1 System
11 Cell
20 Core network
30 PDN (Packet Data Network)
50 Grant-free transmission available resource
51 Unused resource
52 Used resource
60 Grant-based transmission resource
100 Base station apparatus
110 Antenna unit
120 Wireless communication unit
130 Network communication unit
140 Storage unit 150 Control unit
151 Setting unit
153 Communication processing unit
200 Terminal apparatus, URLLC terminal
210 Antenna unit
220 Wireless communication unit
230 Storage unit
240 Control unit
241 Setting unit
243 Communication processing unit
300 Terminal apparatus, eMBB terminal

The invention claimed is:

1. A communication apparatus that communicates with a base station apparatus, the communication apparatus comprising:
setting circuitry that performs setting regarding grant-free transmission available resources based on setting information received from the base station apparatus; and
communication processing circuit that receives, in a predetermined first slot, a downlink control channel including slot format information, the slot format information implicitly indicating dynamically switched parameter information for a grant-free transmission and that uses uplink resources selected from the grant-free transmission available resources to transmit first uplink data, the first uplink data being generated based on the dynamically switched parameter information,
wherein the slot format information comprises:
first slot format information implicitly indicating first parameter information corresponding to when the first uplink data does not interfere with second uplink data of a grant based transmission, and
second slot format information implicitly indicating second parameter information corresponding to when the first uplink data does interfere with the second uplink data of the grant based transmission.

2. The communication apparatus according to claim 1, wherein the first slot is determined based on a transmission time interval of the second uplink data that is longer than the first uplink data.

3. The communication apparatus according to claim 1, wherein the communication processing circuitry monitors the downlink control channel in the first slot.

4. The communication apparatus according to claim 1, wherein in a case where the dynamically switched parameter information is not detected in the first slot, the first uplink data is generated based on predetermined parameter information.

5. The communication apparatus according to claim 1, wherein an application period of the dynamically switched parameter information is determined based on the transmission time interval of the second uplink data longer than the first uplink data.

6. The communication apparatus according to claim 5, wherein a relationship between the first slot and a second slot that is a leading slot of the application period of the dynamically switched parameter information is set specifically for the communication apparatus.

7. The communication apparatus according to claim 6, wherein the communication processing circuitry transmits terminal ability information regarding a time difference between the first slot and the second slot to the base station apparatus.

8. The communication apparatus according to claim 1, wherein the dynamically switched parameter information is determined based on whether or not there is the second uplink data.

9. The communication apparatus according to claim 8, wherein the second uplink data is transmitted by using orthogonal resources that are at least partially a same as the grant-free transmission available resources.

10. The communication apparatus according to claim 1, wherein the first parameter information includes information regarding a first use efficiency and the second parameter information includes information regarding a second use efficiency lower than the first use efficiency, the first use efficiency corresponding to a first modulation system and/or a first encoding rate, and the second use efficiency corresponding to a second modulation system and/or a second encoding rate.

11. The communication apparatus according to claim 1, wherein at least one of:
the first parameter information includes information regarding a first transmission power, and the second parameter information includes information regarding a second transmission power lower than the first transmission power, or
the first parameter information includes information regarding a first beam direction, and the second parameter information includes information regarding a second beam direction having less interference than the first beam direction, or
the first parameter information includes information regarding a first number of layers, and the second parameter information includes information regarding a second number of layers less than the first number of layers, or
the first parameter information includes information regarding a first transmission method, and the second parameter information includes information regarding a second transmission method having use efficiency lower than that of the first transmission method, or
the first parameter information includes information regarding a first slot length, and the second parameter information includes information regarding a second slot length longer than that of the first slot length.

12. The communication apparatus according to claim 1, wherein the second parameter information includes information regarding a transmission method related to a non-orthogonal domain, and the first parameter information includes information regarding a transmission method not using the non-orthogonal domain.

13. The communication apparatus according to claim 1, wherein the first parameter information includes information regarding a first number of repetitions of data transmission, and the second parameter information includes information regarding a second number of repetitions of data transmission higher than the first number of repetitions.

14. The communication apparatus according to claim 1, wherein the first parameter information includes information regarding a first signal waveform, and the second parameter information includes information regarding a second signal waveform having a lower peak-to-average power ratio (PAPR) than the first signal waveform.

15. The communication apparatus according to claim 1, wherein the downlink control channel is generated based on scramble information included in the setting information.

16. A base station apparatus that communicates with a first communication apparatus, the base station apparatus comprising:
 setting circuitry that transmits setting information regarding grant-free transmission available resources to the first communication apparatus; and
 communication processing circuitry that transmits, in a predetermined first slot, a downlink control channel including slot format information, the slot format information implicitly indicating dynamically switched parameter information for a grant-free transmission and that receives first uplink data, the first uplink data being generated by the first communication apparatus based on the dynamically switched parameter information, the first uplink data transmitted from the first communication apparatus using uplink resources selected from the grant-free transmission available resources,
 wherein the slot format information comprises:
  first slot format information implicitly indicating first parameter information corresponding to when the first uplink data does not interfere with second uplink data of a grant based transmission, and
  second slot format information implicitly indicating second parameter information corresponding to when the first uplink data does interfere with the second uplink data of the grant based transmission.

17. A method executed by a communication apparatus that communicates with a base station apparatus, the method comprising:
 performing setting regarding grant-free transmission available resources based on setting information received from the base station apparatus; and
 receiving, in a predetermined first slot, a downlink control channel including slot format information, the slot format information implicitly indicating dynamically switched parameter information for a grant-free transmission and using uplink resources selected from the grant-free transmission available resources to transmit first uplink data, the first uplink data being generated based on the dynamically switched parameter information,
 wherein the slot format information comprises:
  first slot format information implicitly indicating first parameter information corresponding to when the first uplink data does not interfere with second uplink data of a grant based transmission, and
  second slot format information implicitly indicating second parameter information corresponding to when the first uplink data does interfere with the second uplink data of the grant based transmission.

18. A method executed by a base station apparatus that communicates with a first communication apparatus, the method comprising:
 transmitting setting information regarding grant-free transmission available resources to the first communication apparatus; and
 transmitting, in a predetermined first slot, a downlink control channel including slot format information, the slot format information implicitly indicating dynamically switched parameter information for a grant-free transmission and receiving first uplink data, the first uplink data being generated by the first communication apparatus based on the dynamically switched parameter information, the first uplink data transmitted from the first communication apparatus using uplink resources selected from the grant-free transmission available resources,
 wherein the slot format information comprises:
  first slot format information implicitly indicating first parameter information corresponding to when the first uplink data does not interfere with second uplink data of a grant based transmission, and
  second slot format information implicitly indicating second parameter information corresponding to when the first uplink data does interfere with the second uplink data of the grant based transmission.

19. A non-transitory recording medium recording a program for causing a computer to function as:
 a communication apparatus that communicates with a base station apparatus, the communication apparatus comprising
 setting circuitry that performs setting regarding grant-free transmission available resources based on setting information received from the base station apparatus, and
 communication processing circuitry that receives, in a predetermined first slot, a downlink control channel including slot format information, the slot format information implicitly indicating dynamically switched parameter information for a grant-free transmission and that uses uplink resources selected from the grant-free transmission available resources to transmit first uplink data, the first uplink data being generated based on the parameter information dynamically switched,
 wherein the slot format information comprises:
  first slot format information implicitly indicating first parameter information corresponding to when the first uplink data does not interfere with second uplink data of a grant based transmission, and
  second slot format information implicitly indicating second parameter information corresponding to when the first uplink data does interfere with the second uplink data of the grant based transmission.

20. A non-transitory recording medium recording a program for causing a computer to function as:
 a base station apparatus that communicates with a first communication apparatus, the base station apparatus comprising
 setting circuitry that transmits setting information regarding grant-free transmission available resources to the first communication apparatus, and
 communication processing circuitry that transmits, in a predetermined first slot, a downlink control channel including slot format information, the slot format information implicitly indicating dynamically switched parameter information for a grant-free transmission and that receives the first uplink data, the first uplink data being generated by the first communication apparatus based on the dynamically switched parameter information, the first uplink data transmitted from the first communication apparatus using uplink resources selected from the grant-free transmission available resources,
 wherein the slot format information comprises:
  first slot format information implicitly indicating first parameter information corresponding to when the first uplink data does not interfere with second uplink data of a grant based transmission, and
  second slot format information implicitly indicating second parameter information corresponding to when the first uplink data does interfere with the second uplink data of the grant based transmission.

\* \* \* \* \*